United States Patent
Lee et al.

(10) Patent No.: US 12,333,110 B2
(45) Date of Patent: Jun. 17, 2025

(54) TOUCH SENSING PART AND DRIVING METHOD THEREOF

(71) Applicant: SAMSUNG DISPLAY CO., LTD., Yongin-si (KR)

(72) Inventors: Seungrok Lee, Yongin-si (KR); Yerin Oh, Yongin-si (KR); Il Ho Lee, Yongin-si (KR); Wankee Jun, Yongin-si (KR); Hyeonseo Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/400,065

(22) Filed: Dec. 29, 2023

(65) Prior Publication Data
US 2024/0329773 A1   Oct. 3, 2024

(30) Foreign Application Priority Data
Mar. 27, 2023 (KR) ......................... 10-2023-0039627

(51) Int. Cl.
  *G06F 3/041* (2006.01)
  *G06F 3/044* (2006.01)
  *G09G 3/3208* (2016.01)

(52) U.S. Cl.
  CPC ........ *G06F 3/04166* (2019.05); *G06F 3/0412* (2013.01); *G06F 3/0443* (2019.05); *G06F 3/0446* (2019.05); *G09G 3/3208* (2013.01); *G09G 2310/08* (2013.01)

(58) Field of Classification Search
  CPC ..... G01R 27/26; G06F 3/0412; G06F 3/0416; G06F 3/044; G06F 3/0446
  See application file for complete search history.

(56) References Cited

U.S. PATENT DOCUMENTS

| | | | |
|---|---|---|---|
| 6,570,707 B1 | 5/2003 | Murakami et al. | |
| 10,139,964 B2 | 11/2018 | Watnabe et al. | |
| 11,662,859 B2 | 5/2023 | Kim et al. | |
| 2017/0168639 A1* | 6/2017 | Imai | G06F 3/04186 |
| 2019/0235660 A1* | 8/2019 | Kim | G06F 3/0414 |
| 2022/0187978 A1* | 6/2022 | Kim | G01K 3/005 |

FOREIGN PATENT DOCUMENTS

| | | |
|---|---|---|
| JP | 6177026 | 8/2017 |
| JP | 6320256 | 5/2018 |
| KR | 10-0744403 | 7/2007 |
| KR | 10-2020-0101255 | 8/2020 |

* cited by examiner

*Primary Examiner* — Nelson M Rosario
(74) *Attorney, Agent, or Firm* — F. CHAU & ASSOCIATES, LLC

(57) ABSTRACT

A driving method of a touch sensing part includes sensing a touch of a user by comparing a capacitance formed by a first sensing electrode and a second sensing electrode crossing the first sensing electrode with a reference value in a reference touch mode, varying the reference value such that the reference value decreases along a decrease in the capacitance, during a first period, when an ambient temperature is lower than a reference temperature, sensing the user's touch by comparing the reference value and the capacitance, with the reference value maintained uniformly, during a second period following the first period, when the touch of the user is made, and varying the reference value such that the reference value decreases, during a third period following the second period.

21 Claims, 20 Drawing Sheets

TOUCH SENSING PART AND DRIVING METHOD THEREOF

CROSS-REFERENCE TO RELATED APPLICATIONS

This application claims priority under 35 U.S.C. § 119 to Korean Patent Application No. 10-2023-0039627, filed on Mar. 27, 2023 in the Korean Intellectual Property Office, the disclosure of which is incorporated by reference herein in its entirety.

TECHNICAL FIELD

Embodiments of the present disclosure relate to a touch sensing part and a driving method thereof.

Discussion of Related Art

An electronic device, which provides an image to a user, may include, for example, a smartphone, a digital camera, a notebook computer, a navigation system, or a smart television, which may include a display device that displays an image. The display device may include a display panel that generates an image and an input device such as a touch sensing part that senses a touch input.

SUMMARY

Embodiments of the present disclosure provide a touch sensing part capable of preventing a ghost touch phenomenon, and a driving method thereof.

According to an embodiment, a driving method of a touch sensing part includes sensing a touch of a user by comparing a capacitance formed by a first sensing electrode and a second sensing electrode crossing the first sensing electrode with a reference value in a reference touch mode, varying the reference value such that the reference value decreases along a decrease in the capacitance, during a first period, when an ambient temperature is lower than a reference temperature, sensing the touch of the user by comparing the reference value and the capacitance, with the reference value maintained uniformly, during a second period following the first period, when the touch of the user is made, and varying the reference value such that the reference value decreases, during a third period following the second period.

According to an embodiment, a driving method of a touch sensing part includes sensing a touch of a user by comparing a capacitance formed by a first sensing electrode and a second sensing electrode crossing the first sensing electrode with a reference value in a reference touch mode, varying the reference value depending on a change in the capacitance, during a first period, when an ambient temperature is lower than a reference temperature, sensing the touch of the user by comparing the reference value and the capacitance, with the reference value maintained uniformly, during a second period following the first period, when the touch of the user is made, and varying the reference value during a third period following the second period.

According to an embodiment, a touch sensing part may include a first sensing electrode, a second sensing electrode that is insulated from and intersects the first sensing electrode, a sensing control part that applies a driving signal to the first sensing electrode, receives a sensing signal through the second sensing electrode, and compares the sensing signal and a reference value, and a temperature sensor that senses an ambient temperature. The sensing signal may be defined as a change in a capacitance formed by the first and second sensing electrodes. When the ambient temperature is lower than a reference temperature, the sensing control part may decrease the reference value along a decrease in the capacitance. When a touch of a user is made, the sensing control part may sense the touch of the user by comparing the reference value and the capacitance, with the reference value maintained uniformly. The sensing control part may vary the reference value such that the reference value decreases, during a given period following the touch sensing.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
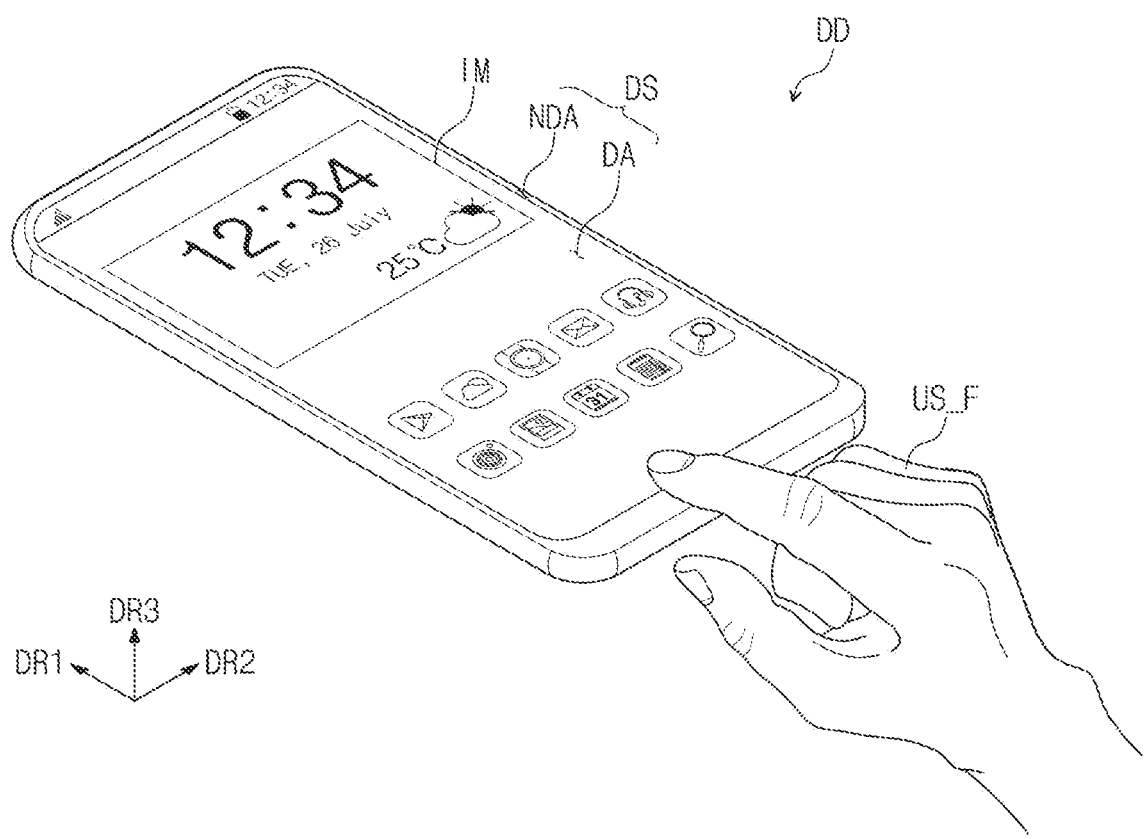
FIG. 1 is a perspective view of a display device including a touch sensing part according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The term "and/or" includes one or more combinations of the associated listed items.

The terms "first", "second", etc. are used to describe various components, but the components are not limited by the terms. The terms are only used to distinguish one component from another component. For example, without departing from the scope and spirit of the present disclosure, a "first" component may be referred to as a "second" component, and similarly, the "second" component may be referred to as the "first" component.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

A touch sensing part may be disposed on a display panel and may sense a user's touch. The touch sensing part may include an input sensing part including first sensing electrodes and second sensing electrodes, and a sensing control part that drives the input sensing part, where the first sensing electrodes and the second sensing electrodes cross each other and are insulated from each other. The sensing control part may apply a driving signal to the first sensing electrodes and may receive a sensing signal through the second sensing electrodes.

A capacitance may be formed by the first and second sensing electrodes. The sensing control part may determine whether the user's touch is made, by comparing the capacitance with a reference value. For example, before the user's touch is made, the capacitance has a value greater than the reference value. When the user's touch is made, the capacitance may be varied to have a value smaller than the reference value. When the capacitance has the value smaller than the reference value, the sensing control part may sense the user's touch.

FIG. 1 is a perspective view of a display device including a touch sensing part according to an embodiment of the present disclosure.

Referring to FIG. 1, a display device DD may have a shape of a rectangle where short sides (or edges) extending in a first direction DR1 and long sides (or edges) extending in a second direction DR2 intersecting the first direction DR1. However, the present disclosure is not limited thereto. For example, the display device DD may have various shapes such as a circle and a polygon.

Below, a direction that is substantially perpendicular to a plane defined by the first direction DR1 and the second direction DR2 is defined as a third direction DR3. Also, in the specification, the expression "when viewed from above a plane" or "when viewed in a plan view" means a state of being viewed in the third direction DR3.

An upper surface of the display device DD may be defined as a display surface DS and may have a plane defined by the first direction DR1 and the second direction DR2. Images IM generated by the display device DD may be provided to the user through the display surface DS. The display device DD may sense the user's touch made through the user's hand US_F.

The display surface DS may include a display area DA and a non-display area NDA disposed adjacent to (or around) the display area DA. An image may be displayed in the display area DA, and an image is not displayed in the non-display area NDA. The non-display area NDA may surround the display area DA and may define a border of the display device DD printed with a given color. For example, the non-display area NDA may correspond to a bezel of the display device DD.

Figure 2:
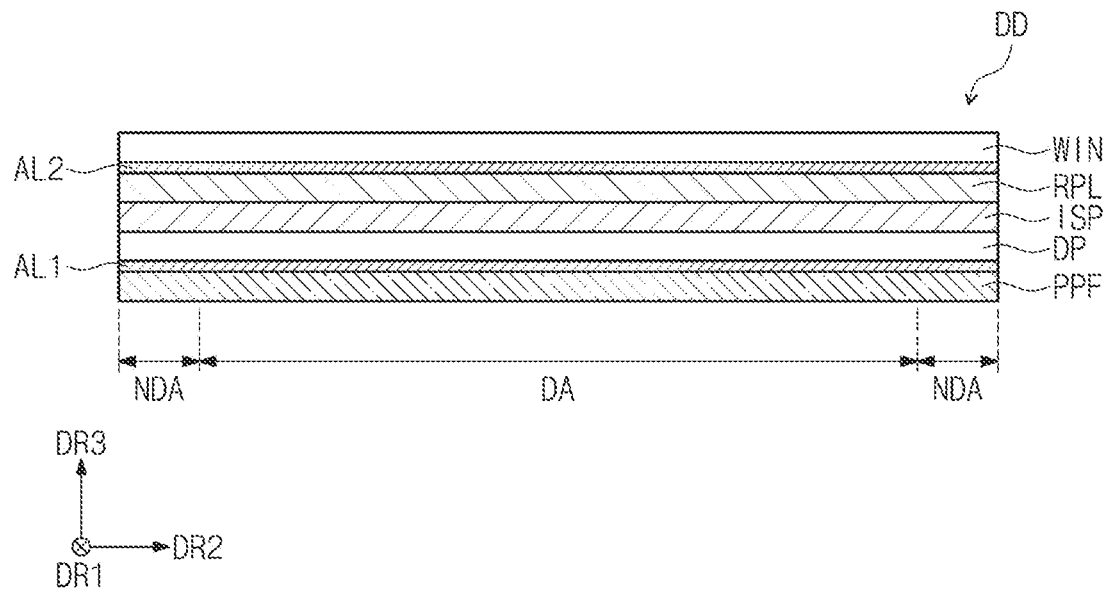
FIG. 2 is a diagram illustrating a cross-section of the display device illustrated in FIG. 1.

FIG. 2 is a diagram illustrating a cross-section of the display device DD illustrated in FIG. 1.

In an embodiment, the cross-section of the display device DD, which is viewed in the first direction DR1, is illustrated in FIG. 2.

Referring to FIG. 2, the display device DD may include a display panel DP, an input sensing part ISP, a reflection preventing layer RPL, a window WIN, a panel protecting film PPF, a first adhesive layer AL1, and a second adhesive layer AL2.

The display panel DP may be a flexible display panel. The display panel DP according to an embodiment of the present disclosure may be, for example, a light-emitting display panel, but is not particularly limited thereto. For example, the display panel DP may be an organic light-emitting display panel or an inorganic light-emitting display panel. An emission layer of the organic light-emitting display layer may include an organic light-emitting material. An emission layer of the inorganic light-emitting display panel may include, for example, a quantum dot, a quantum rod, etc. Below, the description will be given under the condition that the display panel DP is an organic light-emitting display panel. However, the present disclosure is not limited thereto.

The input sensing part ISP may be disposed on the display panel DP. The input sensing part ISP may include a plurality of sensors that sense an external input in a capacitive scheme. The input sensing part ISP may be manufactured directly on the display panel DP when the display device DD is manufactured. However, the present disclosure is not limited thereto. For example, the input sensing part ISP may be manufactured with a panel independent of the display panel DP and may then be attached to the display panel DP by an adhesive layer.

The reflection preventing layer RPL may be disposed on the input sensing part ISP. The reflection preventing layer RPL may be manufactured directly on the input sensing part ISP when the display device DD is manufactured. However, the present disclosure is not limited thereto. For example, the reflection preventing layer RPL may be manufactured with an independent panel and may then be attached to the input sensing part ISP by an adhesive layer.

The reflection preventing layer RPL may be defined as a film that prevents or reduces an external light from being reflected. The reflection preventing layer RPL may reduce the reflectance of the external light incident to the display panel DP from above the display device DD. The reflection preventing layer RPL may prevent the external light from being visually perceived by the user.

When the external light traveling toward the display panel DP is reflected from the display panel DP and is again provided to an external user, like a mirror, the user may visually perceive the external light. To prevent the above phenomenon, in an embodiment, the reflection preventing layer RPL may include a plurality of color filters that display the same color as pixels of the display panel DP.

The color filters may filter the external light with the same color as the pixels. In this case, according to embodiments, the external light is not visually perceived by the user. However, the present disclosure is not limited thereto. For example, the reflection preventing layer RPL may include a retarder and/or a polarizer for the purpose of reducing the reflectance of the external light.

The window WIN may be disposed on the reflection preventing layer RPL. The window WIN may protect the display panel DP, the input sensing input ISP, and the reflection preventing layer RPL from external scratches and impacts.

The panel protecting film PPF may be disposed under the display panel DP. The panel protecting film PPF may protect a bottom surface of the display panel DP. The panel protecting film PPF may include a flexible plastic material such as, for example, polyethylene terephthalate (PET).

The first adhesive layer AL1 may be disposed between the display panel DP and the panel protecting film PPF, and the display panel DP and the panel protecting film PPF may be tightly coupled to each other by the first adhesive layer AL1. The second adhesive layer AL2 may be disposed between the window WIN and the reflection preventing layer RPL, and the window WIN and the reflection preventing layer RPL may be tightly coupled to each other by the second adhesive layer AL2.

Figure 3:
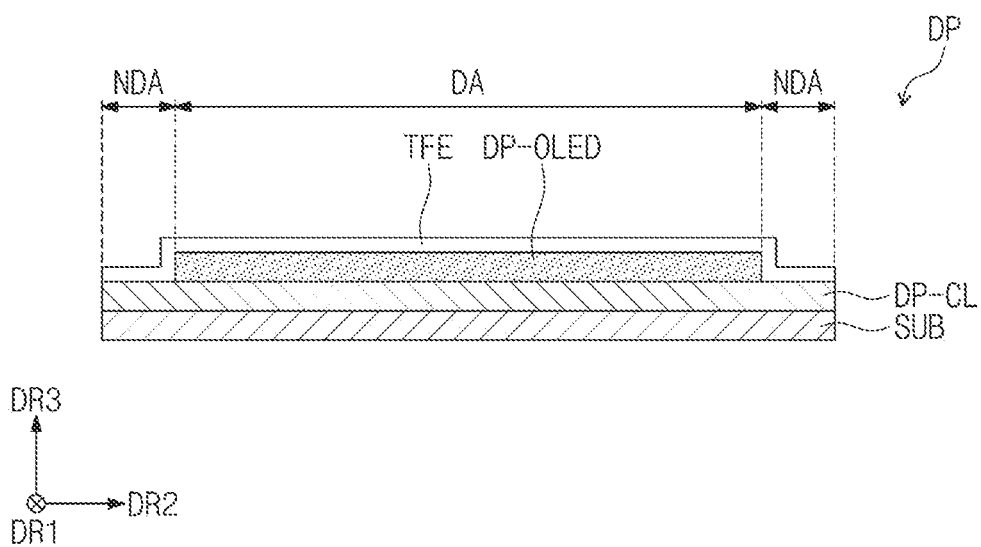
FIG. 3 is a view illustrating a cross-section of the display panel illustrated in FIG. 2.

FIG. 3 is a view illustrating a cross-section of the display panel DP illustrated in FIG. 2.

In an embodiment, the cross-section of the display panel DP, which is viewed in the first direction DR1, is illustrated in FIG. 3.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include the display area DA and the non-display area NDA around the display area DA. The substrate SUB may include a flexible plastic material such as, for example, glass or polyimide (PI). The display element layer DP-OLED may be disposed in the display area DA.

A plurality of pixels may be disposed in the circuit element layer DP-CL and the display element layer DP-OLED. Each of the pixels may include transistors that are disposed in the circuit element layer DP-CL and a light-emitting element that is disposed in the display element layer DP-OLED and are connected to the transistors.

The thin film encapsulation layer TFE may be disposed on the circuit element layer DP-CL so as to cover the display element layer DP-OLED. The thin film encapsulation layer TFE may protect the pixels from, for example, moisture, oxygen, and external foreign material.

Figure 4:
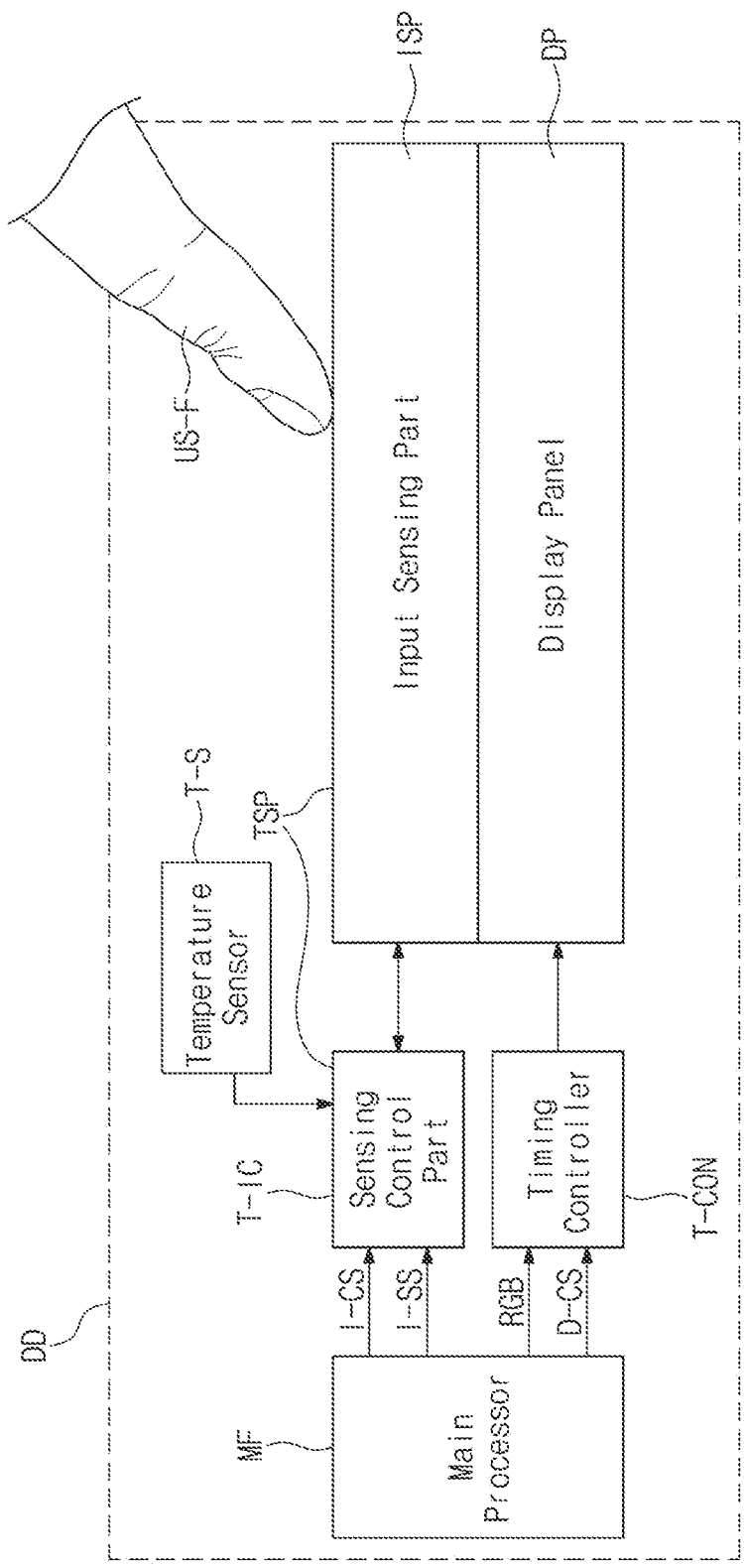
FIG. 4 is a block diagram of the display device illustrated in FIG. 1.

FIG. 4 is a block diagram of the display device DD illustrated in FIG. 1.

Referring to FIG. 4, the display device DD may include the display panel DP, a touch sensing part TSP, a timing controller T-CON, a main processor MF, and a temperature sensor T-S. The touch sensing part TSP may include the input sensing part ISP and a sensing control part T-IC. The input sensing part ISP may correspond to the input sensing part ISP illustrated in FIG. 2. The temperature sensor T-S may be defined as a component of the touch sensing part TSP.

The main processor MF may control an overall operation of the display device DD. For example, the main processor MF may control operations of the timing controller T-CON and the sensing control part T-IC. The main processor MF may include at least one microprocessor. Also, the main processor MF may further include a graphics processor. The main processor MF may also be referred to as an "application processor" or a "main processor".

The timing controller T-CON may allow the display panel DP to operate. The timing controller T-CON may receive image signals RGB and a control signal D-CS from the main processor MF. The control signal D-CS may include various signals. For example, the control signal D-CS may include a vertical synchronization signal, a horizontal synchronization signal, a main clock, a data enable signal, etc. The timing controller T-CON may generate signals that control the timing to drive the display panel DP, based on the control signal D-CS.

The sensing control part T-IC may control the input sensing part ISP. The sensing control part T-IC may receive a control signal I-CS from the main processor MF. The control signal I-CS may include a mode determination signal that determines a driving mode of the sensing control part T-IC and a clock signal. The sensing control part T-IC may also be referred to as a sensing control circuit.

When the user's hand US_F touches the input sensing part ISP, the sensing control part T-IC may calculate coordinate information of a touch point based on the sensing signal received from the input sensing part ISP. That is, the sensing control part T-IC may sense the user's touch based on the sensing signal. The sensing control part T-IC may provide the main processor MF with a coordinate signal I-SS including the coordinate information.

The sensing signal may be defined as a change in a capacitance of a capacitor formed by the sensing electrodes of the input sensing part ISP. The input sensing part ISP may compare the sensing signal and the reference value to determine whether the user's touch is made. The reference value may be set to a given value and may be stored in the input sensing part ISP. The reference value may be defined as a baseline.

The capacitance may have a value greater than the reference value. When the user's touch is not made, the capacitance may be maintained with a uniform value without change. Accordingly, in embodiments, when the value of the capacitance is greater than the reference value, the input sensing part ISP does not perform the touch sensing operation.

When the user's touch is made, an additional capacitor may be formed by the user's hand US_F and the sensing electrodes. In this case, the capacitance of the capacitor formed by the sensing electrodes may change. For example, when the user's touch is made, the value of the capacitance may be smaller than the reference value. When the value of the capacitance is smaller than the reference value, the input sensing part ISP may sense the user's touch and may calculate the above coordinate information.

The main processor MF may perform an operation corresponding to a user input based on the coordinate signal I-SS. For example, the main processor MF may drive the timing controller T-CON such that a new application image is displayed on the display panel DP.

The temperature sensor T-S may sense an ambient temperature. The sensing control part T-IC may sense the ambient temperature and may provide information about the sensed temperature to the sensing control part T-IC. The touch sensing part TSP may operate in a reference touch mode or a low-temperature touch mode depending on the ambient temperature. The above operation will be described in further detail below.

The sensing control part T-IC that receives the information about the ambient temperature may vary the reference value when the sensed ambient temperature is lower than a reference temperature. For example, when the ambient temperature is a subzero temperature lower than the reference temperature set to "0 degree", the sensing control part T-IC and the input sensing part ISP may be driven in the low-temperature touch mode, and the sensing control part T-IC may vary the reference value. The above operation will be described in further detail below.

Figure 5:
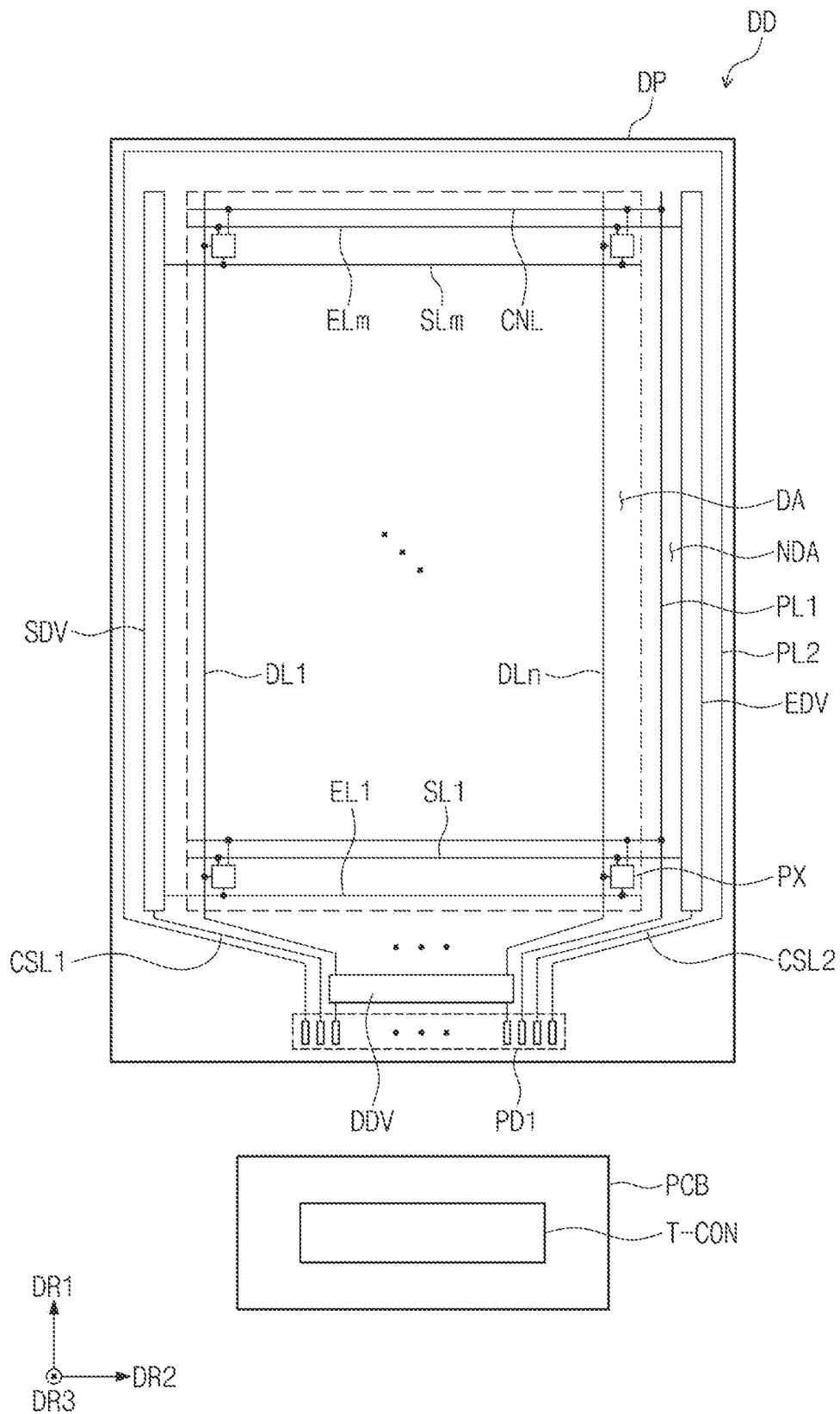
FIG. 5 is a plan view of the display panel illustrated in FIG. 2.

FIG. 5 is a plan view of the display panel DP illustrated in FIG. 2.

Referring to FIG. 5, the display device DD may include the display panel DP, a scan driver SDV, a data driver DDV, a light emission driver EDV, a printed circuit board PCB, the timing controller T-CON, and a plurality of first pads PD1.

The display panel DP may be in the shape of a rectangle where long sides (or edges) extend in the first direction DR1 and short sides (or edges) extend in the second direction DR2. However, the shape of the display panel DP is not limited thereto. The display panel DP may include the display area DA and the non-display area NDA disposed adjacent to (or around) the display area DA.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, first and second power lines PL1 and PL2, and connection lines CNL. Herein, "m" and "n" are positive integers.

The pixels PX may be disposed in the display area DA. The scan driver SDV and the light emission driver EDV may be disposed in the non-display area NDA so as to be adjacent to the respective long sides of the display panel DP. The data driver DDV may be disposed in the non-display area NDA so as to be adjacent to one of the short sides of the display panel DP. When viewed in a plan view, the data driver DDV may be adjacent to a lower (or bottom) end of the display panel DP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The emission lines EL1 to ELm may extend in the second direction DR2 and may be connected to the pixels PX and the light emission driver EDV.

The first power line PL1 may extend in the first direction DR1 and may be disposed in the non-display area NDA. The first power line PL1 may be disposed between the display area DA and the light emission driver EDV, but the present disclosure is not limited thereto. For example, the first power line PL1 may be disposed between the display area DA and the scan driver SDV in an embodiment.

The connection lines CNL may extend in the second direction DR2, may be arranged in the first direction DR1, and may be connected to the first power line PL1 and the pixels PX. A first voltage may be applied to the pixels PX through the first power line PL1 and the connection lines CNL that are connected to each other.

The second power line PL2 may be disposed in the non-display area NDA and may extend along the long sides of the display panel DP and one short side of the display panel DP, at which the data driver DDV is not disposed. Compared to the scan driver SDV and the light emission driver EDV, the second power line PL2 may be disposed to be closer to the outside of the display device DD.

The second power line PL2 may extend toward the display area DA and may be connected to the pixels PX. A second voltage that is lower in level than the first voltage may be applied to the pixels PX through the second power line PL2.

The first control line CSL1 may be connected to the scan driver SDV and may extend toward the lower end of the display panel DP. The second control line CSL2 may be connected to the light emission driver EDV and may extend toward the lower end of the display panel DP. The data driver DDV may be disposed between the first control line CSL1 and the second control line CSL2.

The first pads PD1 may be disposed in the non-display area NDA so as to be adjacent to the lower end of the display panel DP and may be closer to the lower end of the display panel DP than the data driver DDV. The data driver DDV, the first power line PL1, the second power line PL2, the first control line CSL1, and the second control line CSL2 may be connected to first pads PD1. The data lines DL1 to DLn may be connected to the data driver DDV, and the data driver DDV may be connected to the first pads PD1 corresponding to the data lines DL1 to DLn.

The timing controller T-CON may control the operations of the scan driver SDV, the data driver DDV, and the light emission driver EDV. The timing controller T-CON may be mounted on the printed circuit board PCB. The printed circuit board PCB may be connected to the first pads PD1, and the timing controller T-CON may be connected to the display panel DP through the first pads PD1.

The timing controller T-CON may receive the image signals RGB and the control signal D-CS from the main processor MF. The timing controller T-CON may generate a plurality of image data "DATA" by converting the data format of the image signals RGB so as to be suitable for an interface specification with the data driver DDV. The timing controller T-CON may provide the data driver DDV with the plurality of image data "DATA" whose data format is converted.

The timing controller T-CON may generate and output a first control signal, a second control signal, and a third control signal in response to the control signal D-CS. The first control signal may be defined as a scan control signal, the second control signal may be defined as a data control signal, and the third control signal may be defined as an emission control signal. The first control signal may be provided to the scan driver SDV, the second control signal may be provided to the data driver DDV, and the third control signal may be provided to the light emission driver EDV.

The scan driver SDV may generate a plurality of scan signals in response to the first control signal, and the scan signals may be applied to the pixels PX through the scan lines SL1 to SLm. The data driver DDV may generate a plurality of data voltages corresponding to the plurality of image data "DATA" in response to the second control signal, and the data voltages may be applied to the pixels PX through the data lines DL1 to DLn. The light emission driver EDV may generate a plurality of emission signals in response to the third control signal, and the emission signals may be applied to the pixels PX through the emission lines EL1 to ELm.

The pixels PX may be provided with the data voltages in response to the scan signals. The pixels PX may display an image by emitting light having luminance corresponding to the data voltages in response to the emission signals. The emission time of the pixels PX may be controlled by the emission signals.

Figure 6:
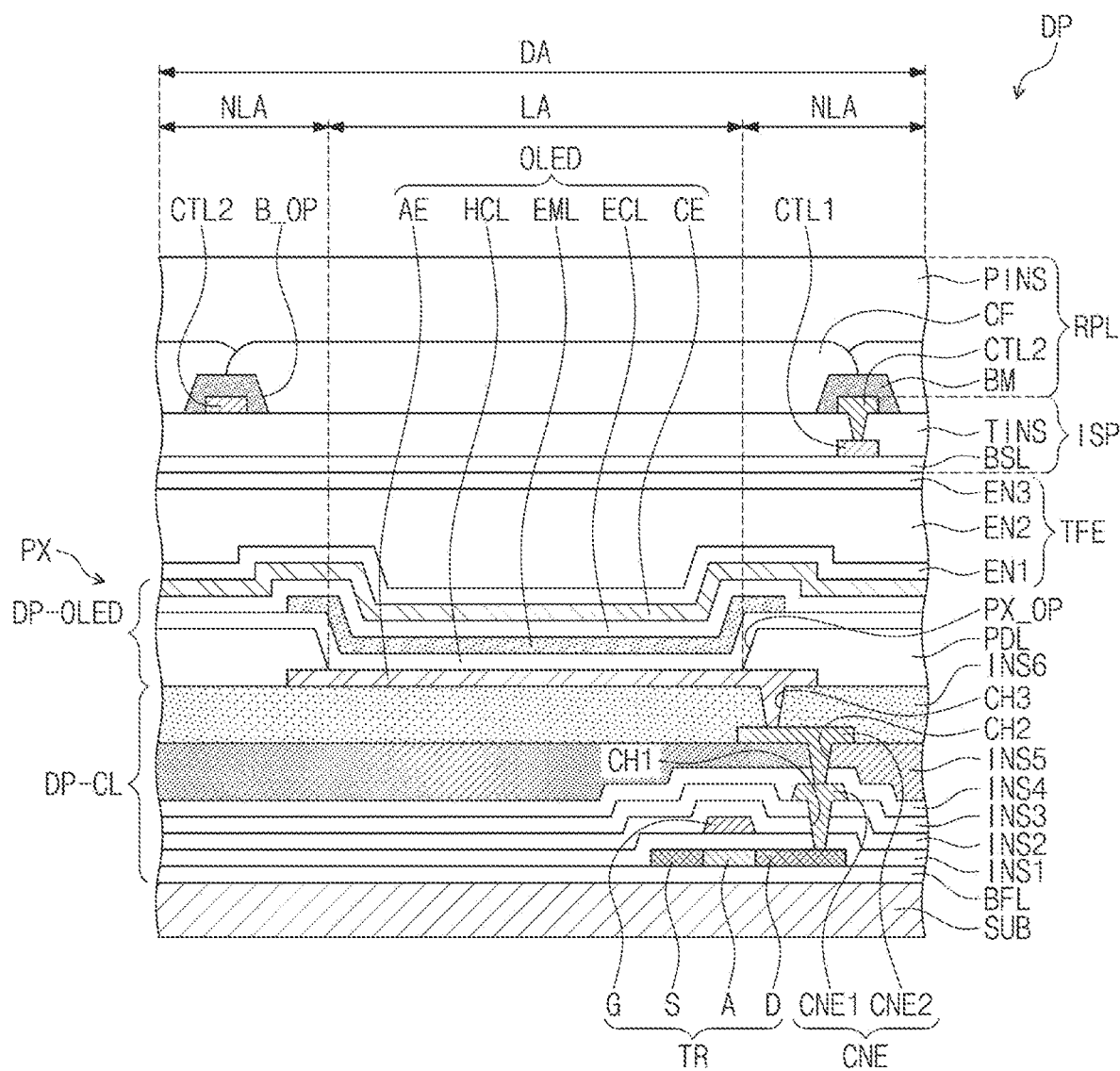
FIG. 6 is a diagram illustrating a cross-section of a display panel, an input sensing part, and a reflection preventing layer corresponding to one pixel illustrated in FIG. 5.

FIG. 6 is a diagram illustrating a cross-section of a display panel, an input sensing part, and a reflection preventing layer corresponding to one pixel illustrated in FIG. 5.

Referring to FIG. 6, the pixel PX may include a transistor TR and a light-emitting element OLED. The light-emitting element OLED may include a first electrode (or anode) AE, a second electrode (or cathode) CE, a hole control layer HCL, an electron control layer ECL, and an emission layer EML.

The transistor TR and the light-emitting element OLED may be disposed on the substrate SUB. In an embodiment, one transistor TR is illustrated. However, the present disclosure is not limited thereto. For example, according to embodiments, the pixel PX may include a plurality of transistors that drive the light-emitting element OLED and at least one capacitor.

The display area DA may include a light-emitting area LA corresponding to each of the pixels PX and a non-light-emitting area NLA disposed adjacent to (or around) the light-emitting area LA. The light-emitting element OLED may be disposed in the light-emitting area LA.

A buffer layer BFL may be disposed on the substrate SUB, and the buffer layer BFL may be an inorganic layer. A semiconductor pattern may be disposed on the buffer layer BFL. The semiconductor pattern may include, for example, polysilicon, amorphous silicon, or metal oxide.

The semiconductor pattern may be doped with an N-type dopant or a P-type dopant. The semiconductor pattern may include a highly doped area and a lightly doped area. Conductivity of the highly doped area may be greater than that of the lightly doped area. The highly doped area may substantially operate as a source electrode or a drain electrode of the transistor TR. The lightly doped area may substantially correspond to an active (or channel) of the transistor TR.

A source S, an active A, and a drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

To connect the transistor TR and the light-emitting element OLED, a connection electrode CNE may include a first connection electrode CNE1 and a second connection electrode CNE2. The first connection electrode CNE1 may be disposed on the third insulating layer INS3 and may be connected to the drain D through a first contact hole CH1 defined in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

A sixth insulating layer INS6 may be disposed on the second connection electrode CNE2. Layers from the buffer layer BFL to the sixth insulating layer INS6 may be defined as the circuit element layer DP-CL. The first to sixth insulating layers INS1 to INS6 may be, for example, inorganic layers or organic layers.

The first electrode AE may be disposed on the sixth insulating layer INS6. The first electrode AE may be connected to the second connection electrode CNE2 through a third contact hole CH3 defined in the sixth insulating layer INS6. A pixel defining layer PDL in which an opening PX_OP that exposes a given portion of the first electrode AE is defined may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The emission layer EML may be disposed on the hole control layer HCL. The emission layer EML may be disposed in an area corresponding to the opening PX_OP. The emission layer EML may include an organic material and/or an inorganic material. The emission layer EML may generate a light with one of a red color, a green color, and a blue color.

The electron control layer ECL may be disposed on the emission layer EML and the hole control layer HCL. The electron control layer ECL may include an electron transport layer and an electron injection layer. The hole control layer HCL and the electron control layer ECL may be disposed in common in the light-emitting area LA and the non-light-emitting are NLA.

The second electrode CE may be disposed on the electron control layer ECL. The second electrode CE may be disposed in the pixels PX in common. A layer in which the light-emitting element OLED is disposed may be defined as the display element layer DP-OLED.

The thin film encapsulation layer TFE may be disposed on the second electrode CE so as to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

Each of the first and third encapsulation layers EN1 and EN3 may include, for example, an inorganic insulating layer and may protect the pixel PX from, for example, moisture/oxygen. The second encapsulation layer EN2 may include, for example, an organic insulating layer and may protect the pixel PX from foreign objects such as dust particles.

The first voltage may be applied to the first electrode AE through the transistor TR, and the second voltage lower in level than the first voltage may be applied to the second electrode CE. Excitons may be formed by coupling holes and electrons injected into the emission layer EML. As the excitons transition to a ground state, the light-emitting element OLED may emit a light.

The input sensing part ISP may be disposed on the thin film encapsulation layer TFE. The input sensing part ISP may be disposed directly on the thin film encapsulation layer TFE.

A base layer BSL may be disposed on the thin film encapsulation layer TFE. The base layer BSL may include an inorganic insulating layer. As the base layer BSL, at least one or more inorganic insulating layers may be provided on the thin film encapsulation layer TFE.

The input sensing part ISP may include a first conductive pattern CTL1 and a second conductive pattern CTL2 disposed on the first conductive pattern CTL1. The first conductive pattern CTL1 may be disposed on the base layer BSL. An insulating layer TINS may be disposed on the base layer BSL and may cover the first conductive pattern CTL1. The insulating layer TINS may include, for example, an inorganic insulating layer or an organic insulating layer. The second conductive pattern CTL2 may be disposed on the insulating layer TINS.

The first and second conductive patterns CTL1 and CTL2 may overlap the non-light-emitting area NLA. The first and second conductive patterns CTL1 and CTL2 may be disposed in the non-light-emitting area NLA between the light-emitting areas LA and may have a mesh shape.

The first and second conductive patterns CTL1 and CTL2 may form sensors of the input sensing part ISP described above. For example, the first and second conductive patterns CTL1 and CTL2 of the mesh shape may be separated from each other in a given area to form the sensors. A portion of the second conductive pattern CTL2 may be connected to the first conductive pattern CTL1. A configuration of the sensors formed by the first and second conductive patterns CTL1 and CTL2 will be described in further detail.

The reflection preventing layer RPL may be disposed on the second conductive pattern CTL2. The reflection preventing layer RPL may include a black matrix BM and a plurality of color filters CF. The black matrix BM may overlap the non-light-emitting area NLA, and the color filters CF may respectively overlap the light-emitting areas LA.

The black matrix BM may be disposed on the insulating layer TINS and may cover the second conductive pattern CTL2. An opening B_OP that overlaps the light-emitting area LA and the opening PX_OP may be defined in the black matrix BM. The black matrix BM may absorb and block the light. A width of the opening B_OP may be greater than a width of the opening PX_OP.

The color filters CF may be disposed on the insulating layer TINS and the black matrix BM. The color filters CF may be respectively disposed in the openings B_OP. A planarization insulating layer PINS may be disposed on the color filters CF. The planarization insulating layer PINS may provide a flat upper surface.

The color filters CF may have the same colors as the pixels PX. The color filters CF may filter the external light so as to have the same colors as the pixels PX. In this case, in embodiments, the external light is not visually perceived by the user.

Figure 7:
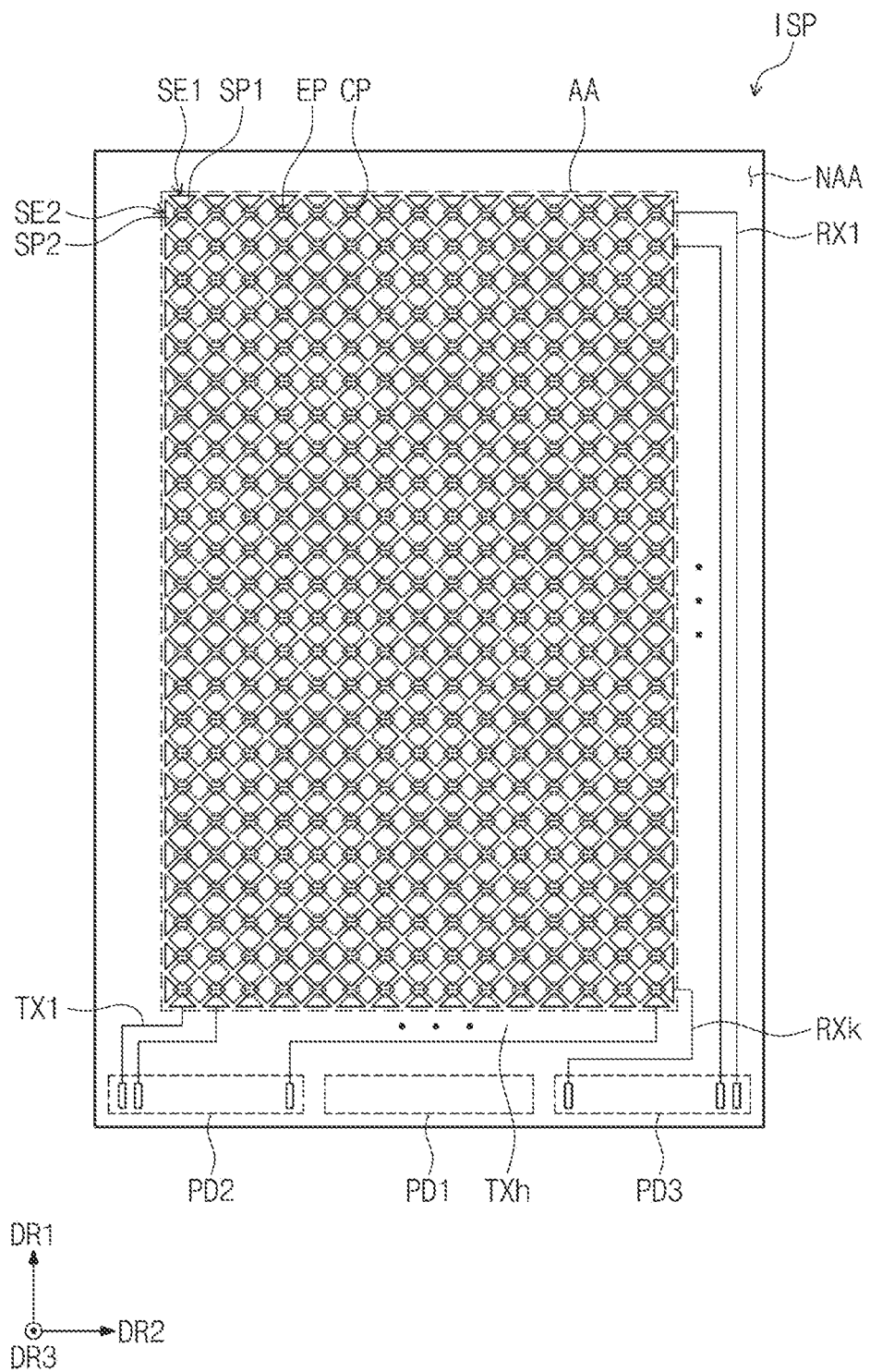
FIG. 7 is a plan view of the input sensing part illustrated in FIG. 2.

FIG. 7 is a plan view of the input sensing part ISP illustrated in FIG. 2.

Referring to FIG. 7, the input sensing part ISP may include a plurality of sensing electrodes SE1 and SE2, a plurality of lines TX1 to TXh and RX1 to RXk, a plurality of second pads PD2, and a plurality of third pads PD3. Here, each of h and k is a positive integer. The sensing electrodes SE1 and SE2, the lines TX1 to TXh and RX1 to RXk, and the second and third pads PD2 and PD3 may be disposed on the thin film encapsulation layer TFE.

A planar area of the input sensing part ISP may include an active area AA and a non-active area NAA adjacent to (or around) the active area AA. The active area AA may overlap the display area DA, and the non-active area NAA may overlap the non-display area NDA.

The sensing electrodes SE1 and SE2 may be disposed in the active area AA, and the second and third pads PD2 and PD3 may be disposed in the non-active area NAA. When viewed in a plan view, the second pads PD2 and the third pads PD3 may be adjacent to the lower end of the input sensing part ISP. When viewed in a plan view, the first pads PD1 may be disposed between the second pads PD2 and the third pads PD3.

The lines TX1 to TXh and RX1 to RXk may be connected to first ends of the sensing electrodes SE1 and SE2 and may extend to the non-active area NAA so as to be connected to the second and third pads PD2 and PD3. According to embodiments, the sensing control part T-IC that controls the input sensing part ISP may be connected to the second and third pads PD2 and PD3 through a printed circuit board.

The sensing electrodes SE1 and SE2 may include the plurality of first sensing electrodes SE1 extending in the first direction DR1 and arranged in the second direction DR2, and the plurality of second sensing electrodes SE2 extending in the second direction DR2 and arranged in the first direction DR1. The second sensing electrodes SE2 may be insulated from the first sensing electrodes SE1 and may extend to intersect the first sensing electrodes SE1.

The lines TX1 to TXh and RX1 to RXk may include the plurality of first lines TX1 to TXh connected to the first sensing electrodes SE1 and the plurality of second lines RX1 to RXk connected to the second sensing electrodes SE2. The first lines TX1 to TXh may extend to the non-active area NAA and may be connected to the second pads PD2. The second lines RX1 to RXk may extend to the non-active area NAA and may be connected to the third pads PD3.

In an embodiment, when viewed in a plan view, the first lines TX1 to TXh may be disposed in the non-active area NAA adjacent to the lower side of the active area AA. When viewed in a plan view, the second lines RX1 to RXk may be disposed in the non-active area NAA adjacent to the right side of the active area AA. The first lines TX1 to TXh may be defined as transmission lines, and the second lines RX1 to RXk may be defined as sensing lines.

Each of the first sensing electrodes SE1 may include a plurality of first sensing parts SP1 arranged in the first direction DR1 and a plurality of connection patterns CP connecting the first sensing parts SP1. Each of the connection patterns CP may be disposed between two first sensing parts SP1 adjacent in the first direction DR1 and may connect the two first sensing parts SP1.

Each of the second sensing electrodes SE2 may include a plurality of second sensing parts SP2 arranged in the second direction DR2 and a plurality of extension patterns EP extended from the second sensing parts SP2. Each of the extension patterns EP may be disposed between two second sensing parts SP2 adjacent in the second direction DR2 and may extend from the two second sensing parts SP2.

In an embodiment, the first sensing parts SP1 and the second sensing parts SP2 do not overlap each other and may be spaced from each other. In this case, the first sensing parts SP1 and the second sensing parts SP2 may be alternately arranged. A capacitance may be formed by the first sensing parts SP1 and the second sensing parts SP2. In an embodiment, the extension patterns EP do not overlap the connection patterns CP.

Figure 8:
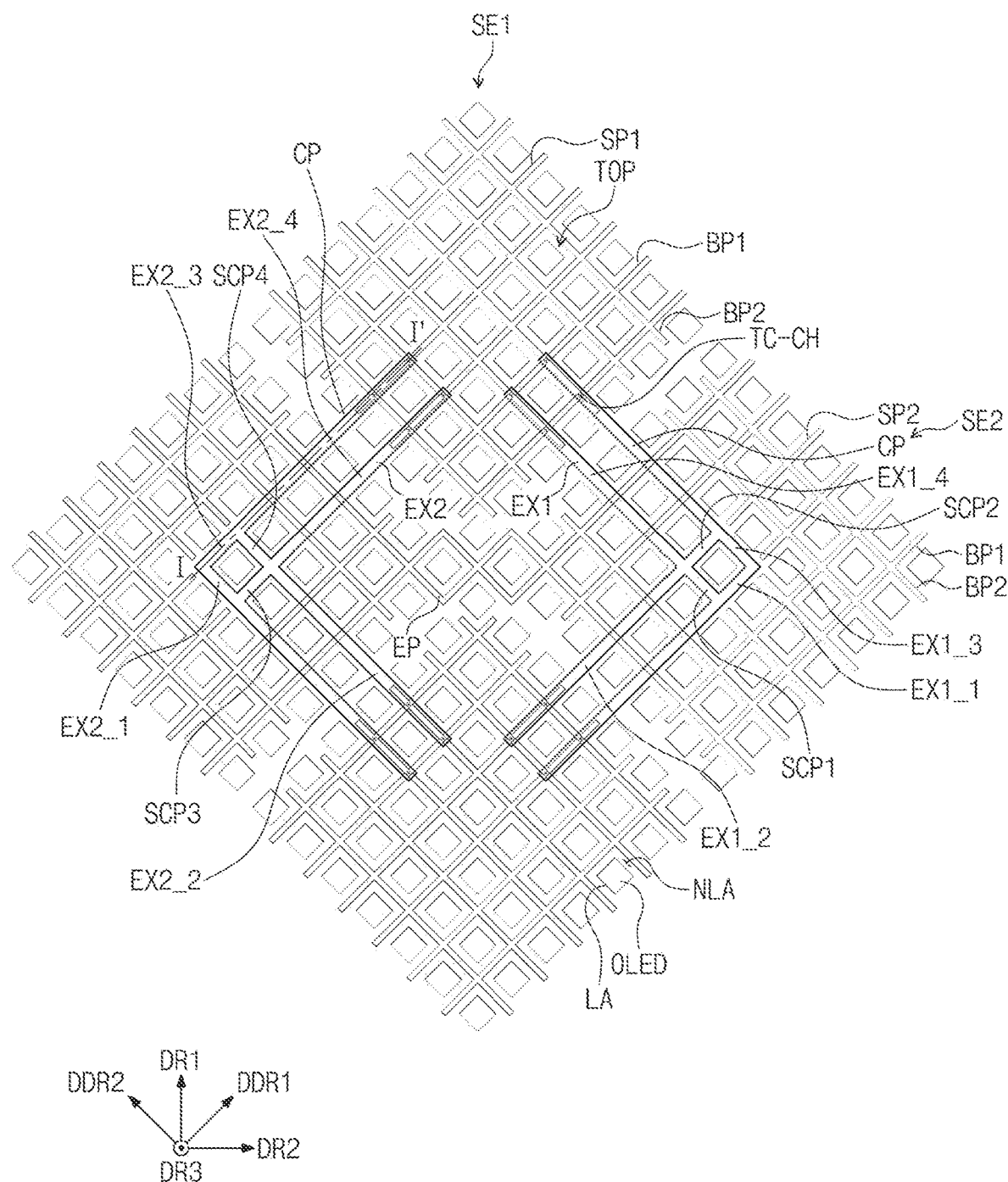
FIG. 8 is an enlarged view of two first sensing parts disposed adjacent to each other and two second sensing parts disposed adjacent to each other, which are illustrated in FIG. 7.

FIG. 8 is an enlarged view of two first sensing parts disposed adjacent to each other and two second sensing parts disposed adjacent to each other, which are illustrated in FIG. 7.

Referring to FIG. 8, the first sensing parts SP1 and the second sensing parts SP2 may have a mesh shape. To have the mesh shape, each of the first and second sensing parts SP1 and SP2 may include a plurality of first branch portions BP1 extending in a first diagonal direction DDR1 and a plurality of second branch portions BP2 extending in a second diagonal direction DDR2.

The first diagonal direction DDR1 may be defined as a direction intersecting the first and second directions DR1 and DR2 on a plane defined by the first and second directions DR1 and DR2. The second diagonal direction DDR2 may be defined as a direction intersecting the first diagonal direction DDR1 on the plane defined by the first and second directions DR1 and DR2. In an embodiment, the first direction DR1 and the second direction DR2 may cross each other to be perpendicular to each other, and the first diagonal direction DDR1 and the second diagonal direction DDR2 may cross each other to be perpendicular to each other.

The first branch portions BP1 of the first and second sensing parts SP1 and SP2 and the second branch portions BP2 of the first and second sensing parts SP1 and SP2 may cross each other and may be integrally formed. Rhombus-shaped touch openings TOP may be defined by the first branch portions BP1 and the second branch portions BP2.

When viewed in a plan view, the light-emitting areas LA may be disposed within the touch openings TOP. The light-emitting elements OLED may be disposed in the light-emitting areas LA. Each of the light-emitting areas LA may correspond to the light-emitting area LA illustrated in FIG. 6. The first and second sensing parts SP1 and SP2 may be disposed in the non-light-emitting area NLA. Because the first and second sensing parts SP1 and SP2 are disposed in the non-light-emitting area NLA, the light generated in the light-emitting areas LA may be output normally without the influence of the first and second sensing parts SP1 and SP2.

The connection pattern CP may extend such that the connection pattern CP does not overlap the extension pattern EP and may connect the first sensing parts SP1. The connection pattern CP may be connected to the first sensing parts SP1 through a plurality of contact holes TC-CH. The structure of the contact holes TC-CH will be described with reference to FIG. 9. The connection pattern CP may extend toward the first sensing parts SP1 through areas overlapping the second sensing parts SP2.

The extension pattern EP may be disposed between the first sensing parts SP1 and may extend from the second sensing electrode SE2. The second sensing electrode SE2 and the extension pattern EP may be integrally formed. The extension pattern EP may have a mesh shape. The extension pattern EP, the first sensing parts SP1, and the second sensing parts SP2 may be disposed in the same layer, may be formed of the same material, and may be simultaneously patterned.

The connection pattern CP may include a first extension part EX1 and a second extension part EX2 being symmetrical in shape to the first extension part EX1. The extension pattern EP may be disposed between the first extension part EX1 and the second extension part EX2.

The first extension part EX1 may extend through an area overlapping one of the second sensing parts SP2 and may be connected to the first sensing parts SP1. The second extension part EX2 may extend through an area overlapping another of the second sensing parts SP2 and may be connected to the first sensing parts SP1.

Below, the first sensing parts SP1 are defined as a first upper sensing part SP1 and a first lower sensing part SP1 depending on a relative placement location. Also, the second sensing parts SP2 are defined as a second left sensing part SP2 and a second right sensing part SP2 depending on a relative placement location.

Portions of the first and second extension parts EX1 and EX2, which are adjacent to first sides of the first and second extension parts EX1 and EX2, may be connected to the first lower sensing part SP1 through the plurality of contact holes TC-CH. Portions of the first and second extension parts EX1 and EX2, which are adjacent to second sides of the first and second extension parts EX1 and EX2 opposite to the first sides thereof, may be connected to the first upper sensing part SP1 through the plurality of contact holes TC-CH.

The first extension part EX1 may include a first sub-extension part EX1_1 and a second sub-extension part EX1_2, which extend in the first diagonal direction DDR1, a third sub-extension part EX1_3 and a fourth sub-extension part EX1_4, which extend in the second diagonal direction DDR2, a first sub-conductive pattern SCP1 extending in the second diagonal direction DDR2, and a second sub-conductive pattern SCP2 extending in the first diagonal direction DDR1.

Portions of first and second sub-extension parts EX1_1 and EX1_2, which are adjacent to first sides of the first and second sub-extension parts EX1_1 and EX1_2, may be connected to the first lower sensing part SP1 through the plurality of contact holes TC-CH. Portions of the third and fourth sub-extension parts EX1_3 and EX1_4, which are adjacent to first sides of the third and fourth sub-extension parts EX1_3 and EX1_4, may be connected to the first upper sensing part SP1 through the plurality of contact holes TC-CH.

A second side of the first sub-extension part EX1_1 opposite to the first side thereof may extend from a second side of the third sub-extension part EX1_3 opposite to the first side thereof, and a second side of the second sub-extension part EX1_2 opposite to the first side thereof may extend from a second side of the fourth sub-extension part EX1_4 opposite to the first side thereof. The first sub-conductive pattern SCP1 may extend from the second side of the fourth sub-extension part EX1_4 in the second diagonal direction DDR2 and may extend to the first sub-extension part EX1_1. The second sub-conductive pattern SCP2 may extend from the second side of the second sub-extension part EX1_2 in the first diagonal direction DDR1 and may extend to the third sub-extension part EX1_3.

The first sub-extension part EX1_1, the second sub-extension part EX1_2, the third sub-extension part EX1_3, the fourth sub-extension part EX1_4, the first sub-conductive pattern SCP1, and the second sub-conductive pattern SCP2 may be integrally formed.

The first and second sub-extension parts EX1_1 and EX1_2 may extend to intersect the given number of second branch portions BP2 adjacent to the first lower sensing part SP1 from among the second branch portions BP2 of the second right sensing part SP2. In embodiments, the first branch portions BP1 of the second right sensing part SP2 are not disposed in some areas overlapping the first and second sub-extension parts EX1_1 and EX1_2 and the second sub-conductive pattern SCP2.

The third and fourth sub-extension parts EX1_3 and EX1_4 may extend to intersect the given number of first branch portions BP1 adjacent to the first upper sensing part SP1 from among the first branch portions BP1 of the second right sensing part SP2. In embodiments, the second branch portions BP2 of the second right sensing part SP2 are not disposed in some areas overlapping the third and fourth sub-extension parts EX1_3 and EX1_4 and the first sub-conductive pattern SCP1.

The second extension part EX2 may include a fifth sub-extension part EX2_1 and a sixth sub-extension part EX2_2, which extend in the second diagonal direction DDR2, a seventh sub-extension part EX2_3 and an eighth sub-extension part EX2_4, which extend in the first diagonal direction DDR1, a third sub-conductive pattern SCP3 extending in the first diagonal direction DDR1, and a fourth sub-conductive pattern SCP4 extending in the second diagonal direction DDR2.

The second left sensing part SP2 may be symmetrical in structure to the second right sensing part SP2, and the second extension part EX2 may be symmetrical in structure to the first extension part EX1. Accordingly, below, additional description associated with the fifth to eighth sub-extension parts EX2_1 to EX2_4 and the third and fourth sub-conductive patterns SCP3 and SCP4 will be omitted to avoid redundancy.

Figure 9:
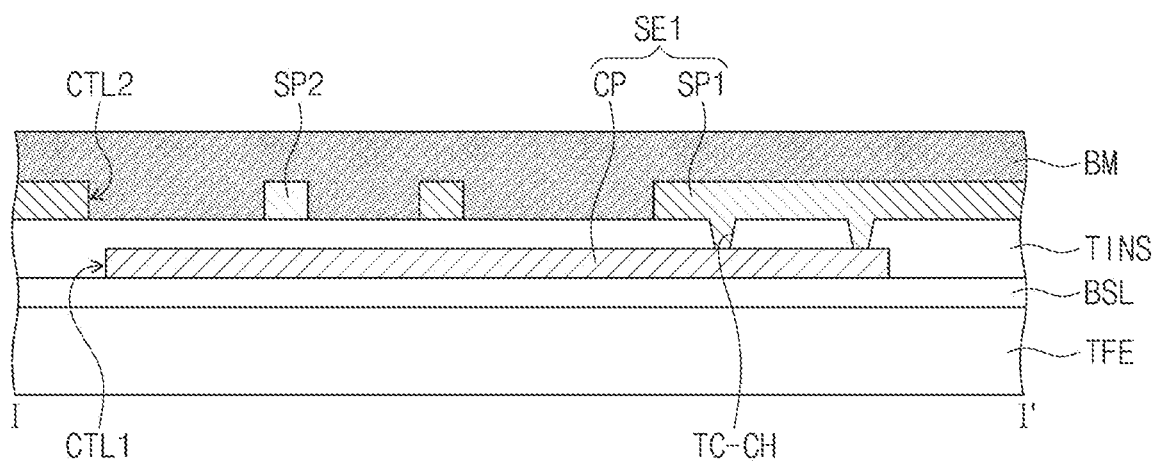
FIG. 9 is a cross-sectional view taken along line I-I' of FIG. 8.

FIG. 9 is a cross-sectional view taken along line I-I' of FIG. 8.

Referring to FIGS. 8 and 9, the base layer BSL may be disposed on a thin film encapsulation TFE. The connection pattern CP may be disposed on the base layer BSL. The insulating layer TINS may be disposed on the connection pattern CP and the base layer BSL. The insulating layer TINS may be disposed on the base layer BSL and may cover the connection pattern CP. The insulating layer TINS may include, for example, an inorganic insulating layer or an organic insulating layer.

The first sensing parts SP1 and the second sensing parts SP2 may be disposed on the insulating layer TINS. The extension pattern EP integrally formed with the second sensing parts SP2 may also be disposed on the insulating layer TINS. The connection pattern CP may be connected to the first sensing parts SP1 through the plurality of contact holes TC-CH defined in the insulating layer TINS. The black matrix BM may be disposed on the first and second sensing parts SP1 and SP2 and the insulating layer TINS. In an embodiment, the planarization insulating layer PINS described above is omitted in FIG. 9.

The first and second sensing parts SP1 and SP2 and the extension patterns EP may be formed by the second conductive pattern CTL2. The connection patterns CP may be formed by the first conductive pattern CTL1.

Figure 10:
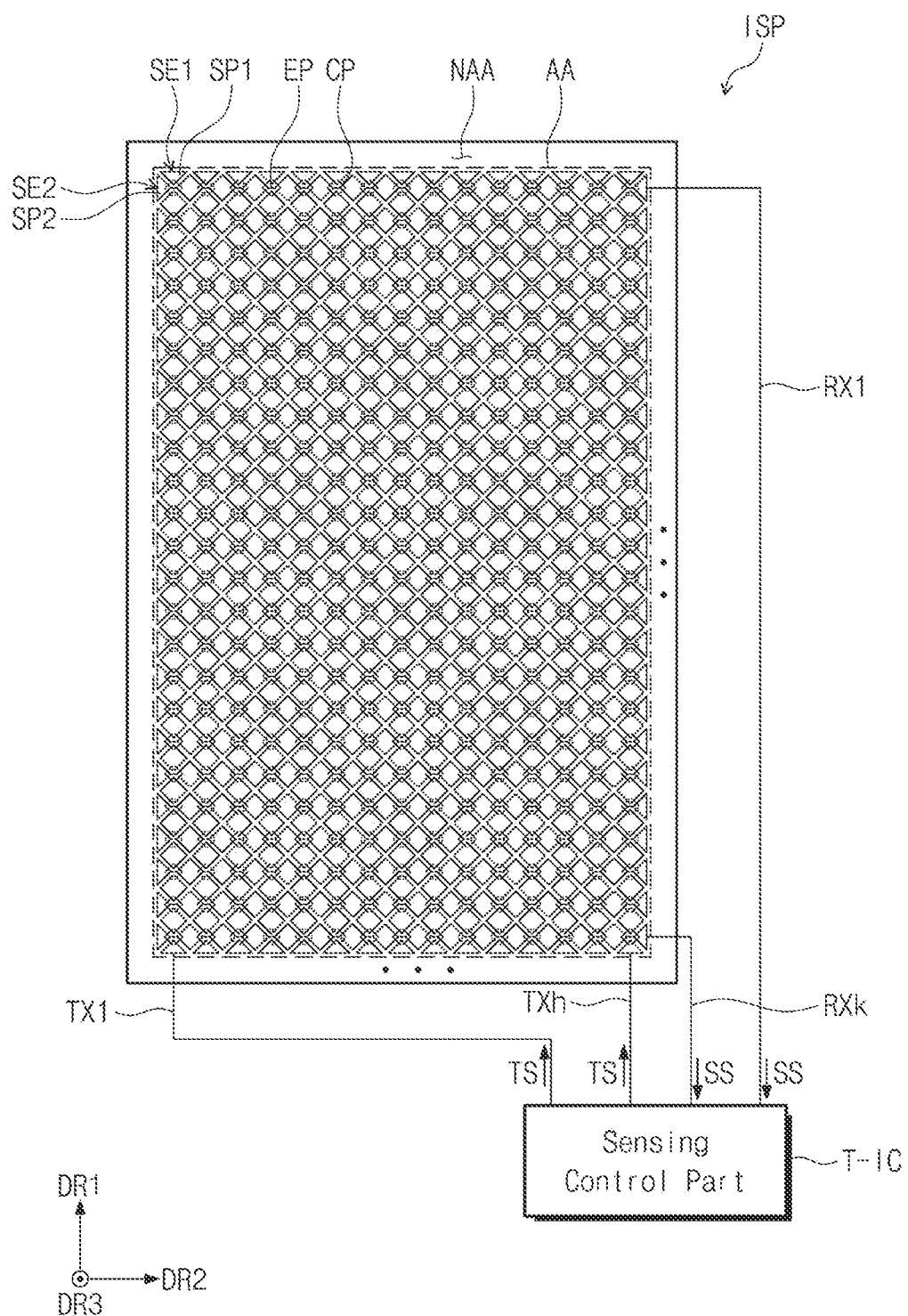
FIG. 10 is a diagram for describing an operation of a mutual sensing mode of the input sensing part illustrated in FIG. 7.
Figure 11:
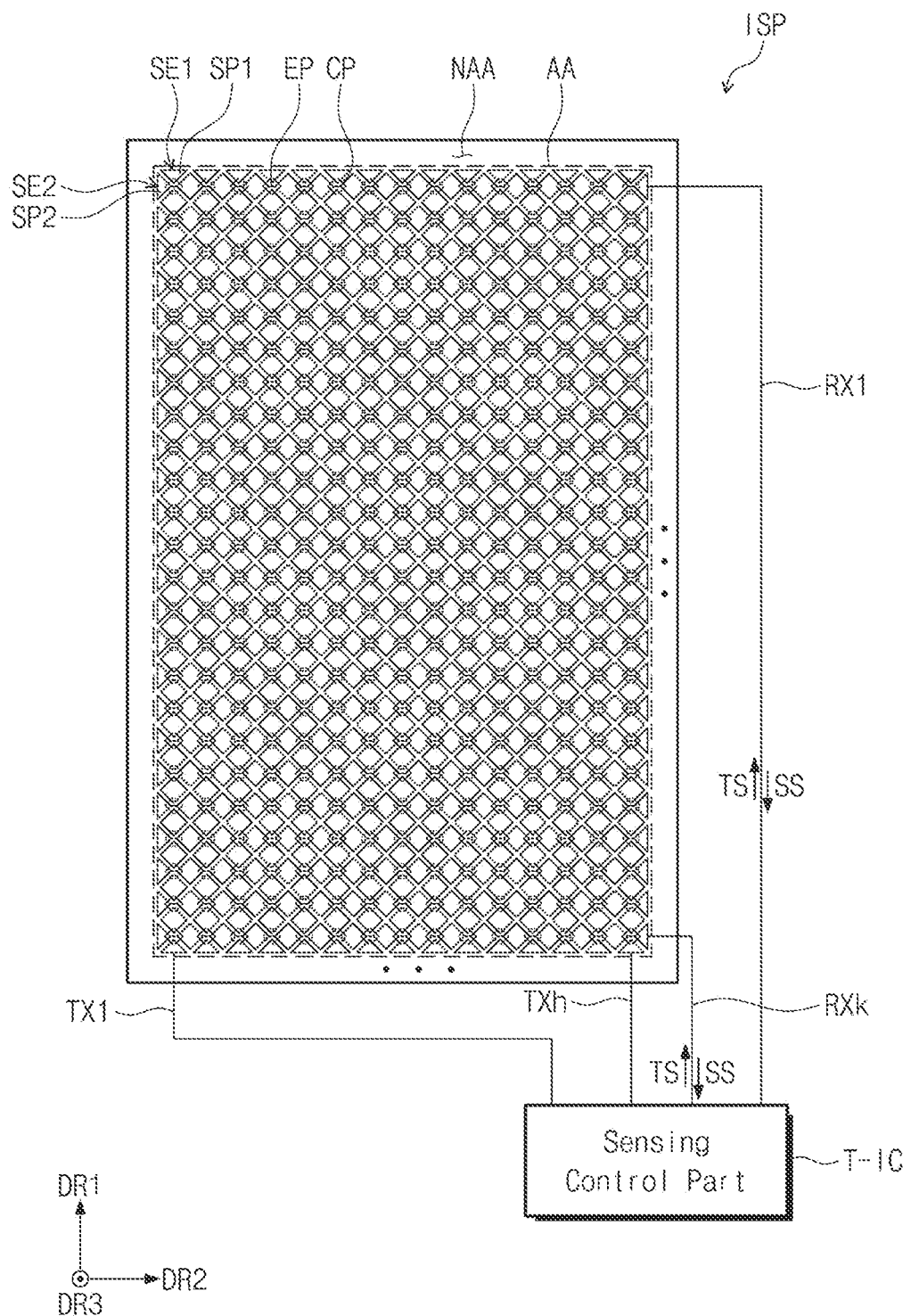
FIG. 11 is a diagram for describing an operation of a self-sensing mode of the input sensing part illustrated in FIG. 7.

FIG. 10 is a diagram for describing an operation of a mutual sensing mode of the input sensing part ISP illustrated in FIG. 7. FIG. 11 is a diagram for describing an operation of a self-sensing mode of the input sensing part ISP illustrated in FIG. 7.

In an embodiment, compared to FIG. 7, the non-active area NAA of FIGS. 10 and 11 is scaled down, and the first and second lines TX1 to TXh and RX1 to RXk are illustrated in a state where the first and second lines TX1 to TXh and RX1 to RXk extend to the outside of the non-active area NAA and are connected to the sensing control part T-IC.

Referring to FIGS. 10 and 11, the input sensing part ISP may be connected to the sensing control part T-IC. For example, the first lines TX1 to TXh may be connected to the sensing control part T-IC, and the second lines RX1 to RXk may be connected to the sensing control part T-IC.

The input sensing part ISP may be driven in the mutual sensing mode or the self-sensing mode by the sensing control part T-IC. The mutual sensing mode and the self-sensing mode may be repeatedly performed.

Referring to FIG. 10, the sensing control part T-IC may allow the input sensing part ISP to operate in the mutual sensing mode. The mutual sensing mode may include a driving mode and a sensing mode. In the driving mode of the mutual sensing mode, the sensing control part T-IC may generate a driving signal TS and may apply the driving signal TS to the first lines TX1 to TXh. The driving signal TS may be applied to the first sensing electrodes SE1 through the first lines TX1 to TXh. The driving signal TS may be sequentially applied to the first lines TX1 to TXh.

In the sensing mode of the mutual sensing mode, the user's touch may be sensed by the first and second sensing electrodes SE1 and SE2. A sensing signal SS sensed in the sensing mode may be output through the second lines RX1 to RXk and may be provided to the sensing control part T-IC. A change in the capacitance of the capacitor formed by the first and second sensing electrodes SE1 and SE2 may be output as the sensing signal SS.

The sensing control part T-IC may obtain coordinates corresponding to a location of the user's touch using the sensing signal SS. The mutual sensing mode of the input sensing part ISP may be performed by the above operation.

Referring to FIG. 11, the sensing control part T-IC may allow the input sensing part ISP to operate in the self-sensing mode. The self-sensing mode may include a driving mode and a sensing mode. In the driving mode of the self-sensing mode, the sensing control part T-IC may apply the driving signal TS to the second lines RX1 to RXk. The driving signal TS may be applied to the second sensing electrodes SE2 through the second lines RX1 to RXk.

In the sensing mode of the self-sensing mode, the user's touch may be sensed, and the sensing signal SS associated with the sensed user's touch may be output through the second lines RX1 to RXk and may then be provided to the sensing control part T-IC. The self-sensing mode of the input sensing part ISP may be performed by the above operation.

In an embodiment, the operation where the input/output of the driving signal TS and the sensing signal SS is made through the second lines RX1 to RXk in the self-sensing mode is described, but the present disclosure is not limited thereto. For example, the driving signal TS may be applied to the first sensing electrodes SE1 through the first lines TX1 to TXh, and the sensing signal SS may be output through the first lines TX1 to TXh and may be provided to the sensing control part T-IC.

Figure 12:
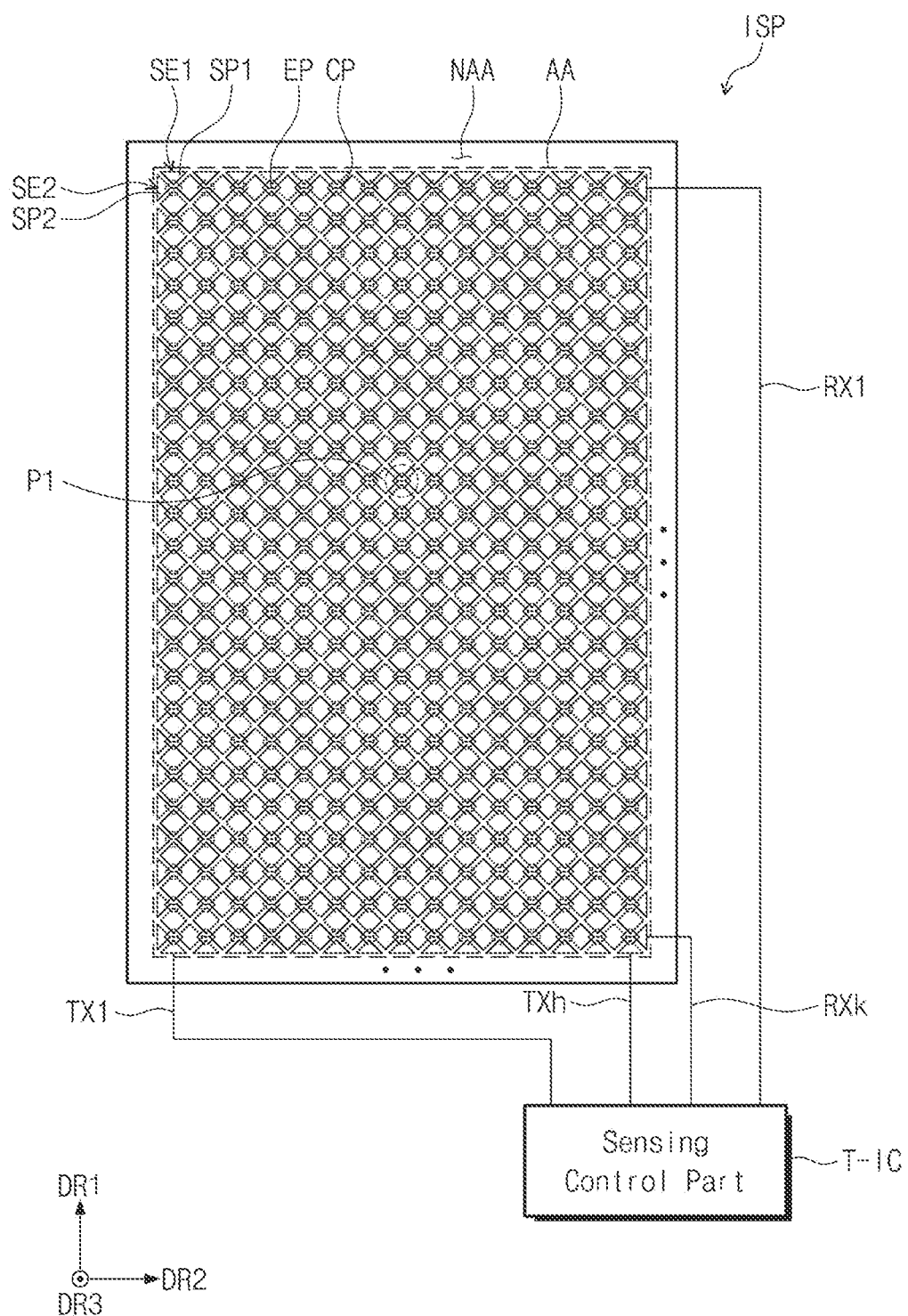
FIG. 12 is a diagram illustrating a point of a user's touch made on the input sensing part illustrated in FIG. 7.
Figure 13:
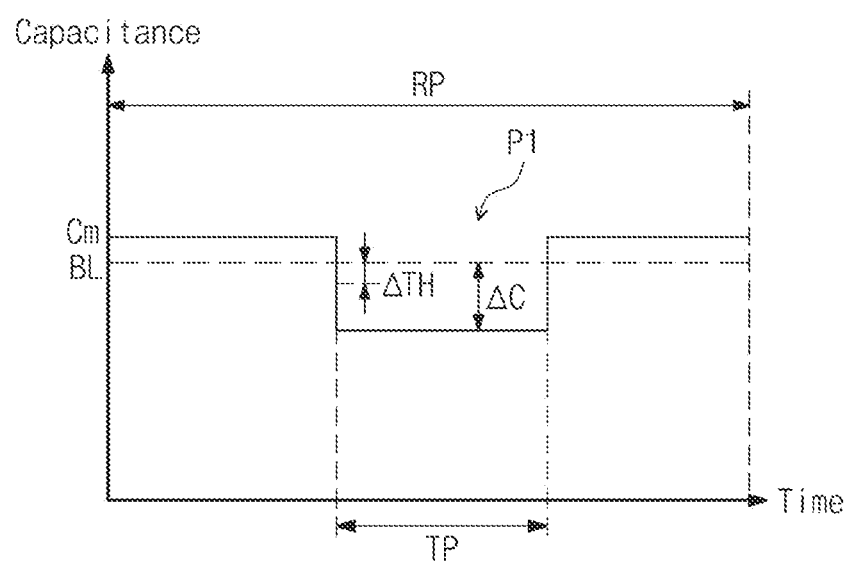
FIG. 13 is a diagram for describing a sensing operation of the sensing control part associated with a touch point of FIG. 12 in a reference touch mode.

FIG. 12 is a diagram illustrating a point of a user's touch made on the input sensing part ISP illustrated in FIG. 7. FIG. 13 is a diagram for describing a sensing operation of the sensing control part T-IC associated with a touch point of FIG. 12 in a reference touch mode.

In FIG. 13, a horizontal axis represents time, and a vertical axis represents a capacitance value.

Referring to FIGS. 12 and 13, a capacitance Cm may be defined as a capacitance value of a capacitor formed at a first point P1 (or defined as a node). A reference value BL may be defined as a capacitance value for comparison with the capacitance Cm.

When the ambient temperature measured by the temperature sensor T-S described above is not lower than the reference temperature, the sensing control part T-IC may be driven in the reference touch mode. A period where the sensing control part T-IC is driven in the reference touch mode may be defined as a reference mode period RP.

In the reference touch mode, when the user's touch is not made, the capacitance Cm and the reference value BL may be maintained with a uniform value. The reference value BL may be defined as the baseline described above. In the reference touch mode, the capacitance Cm may have a value greater than the reference value BL.

The user may touch the first point P1. When the user's touch is made, the user's touch may be sensed during a touch period TP. As described above, when the user's touch is made, the capacitance Cm may vary. For example, during the touch period TP where the user's touch is made, the capacitance Cm may be varied and may become smaller than the reference value BL.

The capacitance Cm may be temporarily varied due to a simple ambient noise, not in a touch state. The touch period TP may be set to a given period such that the capacitance Cm temporarily varied due to the ambient noise is not recognized as a touch. The touch period TP may be set to an arbitrary time period greater than a minimum sensing time. In an embodiment, the minimum sensing time may be set to about 0.1 seconds.

The sensing control part T-IC may sense the user's touch by comparing the reference value BL and the capacitance Cm in the reference touch mode. In embodiments, when the capacitance Cm has the value greater than the reference value BL, the sensing control part T-IC does not recognize the user's touch.

When the capacitance Cm has a value smaller than the reference value BL, the sensing control part T-IC may recognize the user's touch. The sensing control part T-IC may calculate a difference value ΔC between the capacitance Cm and the reference value BL as a sensing value. In this case, the sensing control part T-IC may calculate a touch coordinate value of the first point P1 based on the sensing value.

The capacitance Cm may be temporarily finely varied due to a simple ambient noise. In this case, the difference value ΔC may be very small. Accordingly, a threshold value ΔTH may be set such that the state where the difference value ΔC is very small is not recognized as a touch state. When the difference value ΔC is greater than the threshold value ΔTH, the sensing control part T-IC may calculate the difference value ΔC as the sensing value.

Figure 14:
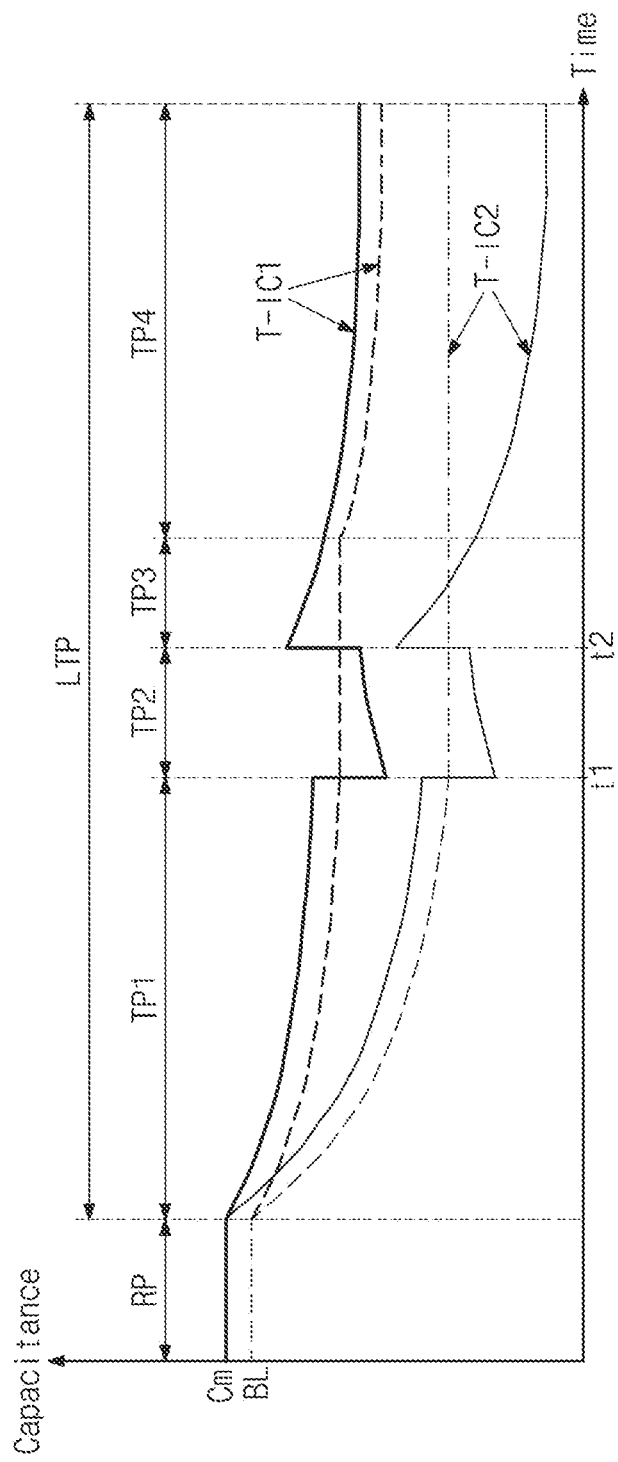
FIG. 14 is a diagram for describing an operation of the sensing control part according to a comparative example.

FIG. 14 is a diagram for describing an operation of the sensing control part T-IC according to a comparative example.

Below, a sensing control part that operates depending on a graph illustrated in FIG. 14 is referred to as a sensing control part according to a comparative example.

Like FIG. 13, in FIG. 14, the horizontal axis represents time, and the vertical axis represents a capacitance value. In FIG. 14, the capacitance Cm is shown by a solid line, and the reference value BL is shown by a dashed line.

Referring to FIGS. 12 and 14, various sensing control parts according to comparative examples may be used. The sensing control parts according to comparative examples should ideally have the same performance, but may substantially have different performances. Below, the sensing control parts according to comparative examples may be divided into a first sensing control part T-IC1 according to a comparative example and a second sensing control part T-IC2 according to a comparative example, and operations of the first and second sensing control parts T-IC1 and T-IC2 according to comparative examples will be described with reference to FIG. 14.

In the graph illustrated in FIG. 14, a driving period of the first and second sensing control parts T-IC1 and T-IC2 according to comparative examples may be divided into the reference mode period RP and a low-temperature mode period LTP. A period where the first and second sensing control parts T-IC1 and T-IC2 according to comparative examples are driven in the reference touch mode described with reference to FIG. 13 may be defined as the reference mode period RP.

When the ambient temperature sensed by the temperature sensor T-S is lower than the reference temperature, the first and second sensing control parts T-IC1 and T-IC2 according to comparative examples may be driven in a low-temperature touch mode. In an embodiment, the reference temperature may be set to a "0 degree", but the reference temperature is not limited thereto. A period where the first and second sensing control parts T-IC1 and T-IC2 according to comparative examples are driven in the low-temperature touch mode as the ambient temperature is lower than the reference temperature may be defined as the low-temperature mode period LTP.

The low-temperature mode period LTP may include a first period TP1, a second period TP2 following the first period TP1, a third period TP3' following the second period TP2, and a fourth period TP4 following the third period TP3'.

The capacitance Cm may be variable at a low temperature. For example, the capacitance Cm may decrease at a low temperature. During the first period TP1, the first comparison sensing control part T-IC1 may vary the reference value BL depending on a change in the capacitance Cm. That is, the first comparison sensing control part T-IC1 may update the reference value BL depending on the change in the capacitance Cm.

As the capacitance Cm decreases during the first period TP1, the first sensing control part T-IC1 according to a comparative example may allow the reference value BL to decrease. For example, at a low temperature, the first comparison sensing control part T-IC1 may sense the decrease in the capacitance Cm of the first point P1 of the input sensing part ISP and may decrease the reference value BL such that the reference value BL has a value smaller than the capacitance Cm. The above operation may be defined as a tracking operation. The first period TP1 may be defined as a tracking period.

When the user's touch is made, the transition from the first period TP1 to the second period TP2 may be made. The second period TP2 may be defined as a touch sensing period. During the second period TP2 where the user's touch is made, the first comparison sensing control part T-IC1 may stop updating the reference value BL and may maintain the reference value BL uniformly. In the second period TP2 where the user's touch is made, the capacitance Cm may be varied and may have the value smaller than the reference value BL.

The first comparison sensing control part T-IC1 may compare the capacitance Cm and the reference value BL to sense the user's touch. Because the capacitance Cm is smaller than the reference value BL, the first comparison sensing control part T-IC1 may perform the sensing operation on the user's touch.

When the user's touch is made during the second period TP2, the capacitance Cm may be varied depending on (or along) the user's temperature. The phrases "depending on" and "or along" may be used interchangeably herein where appropriate. A temperature of the first point P1 may be increased by the user's temperature. Accordingly, during the second period TP2, the capacitance Cm may be varied, that is, increased by the user's temperature while having a value smaller than the reference value BL.

After the user's touch ends, the third period TP3' may be defined as a standby period. The standby period may be defined as a preparation period for again performing the tracking operation after the first comparison sensing control part T-IC1 performs the touch sensing operation.

The first comparison sensing control part T-IC1 may maintain the reference value BL during the third period TP3'. Because the user's touch ends, in the third period TP3', the capacitance Cm may be varied to have the value greater than the reference value BL. In the third period TP3', the capacitance Cm may decrease due to a low temperature. In the third period TP3', the reference value BL may be smaller than the capacitance Cm.

In an embodiment, the variations in the capacitance Cm at a first point in time t1 between the first period TP1 and the second period TP2 may be identical to the variations in the capacitance Cm at a second point in time t2 between the second period TP2 and the third period TP3'.

In the fourth period TP4, like the first period TP1, the first comparison sensing control part T-IC1 may perform the tracking operation. Accordingly, the fourth period TP4 may also be defined as the tracking period.

In the fourth period TP4, as the capacitance Cm decreases due to a low temperature, the first comparison sensing control part T-IC1 may decrease the reference value BL. According to embodiments, the capacitance Cm does not continue to decrease, but the capacitance Cm may be saturated at a specific point in time and may be maintained uniformly. Accordingly, the reference value BL may also be maintained uniformly at the specific point in time.

An operation of the second comparison sensing control part T-IC2 may be similar to the operation of the first comparison sensing control part T-IC1. As the capacitance Cm decreases during the first period TP1, the second comparison sensing control part T-IC2 may allow the reference value BL to decrease.

A decreasing speed of the capacitance Cm in the second comparison sensing control part T-IC2 may be higher than that in the first comparison sensing control part T-IC1. The above speed difference may be caused due to a characteristic difference of sensing control parts.

During the second period TP2 where the user's touch is made, the second comparison sensing control part T-IC2 may uniformly maintain the reference value BL and may compare the capacitance Cm and the reference value BL. Because the capacitance Cm is smaller than the reference value BL, the second comparison sensing control part T-IC2 may perform the sensing operation on the user's touch. Also, during the second period TP2, the capacitance Cm may be varied, that is, increased by the user's temperature while having a value smaller than the reference value BL.

The second comparison sensing control part T-IC2 may maintain the reference value BL during the third period TP3'. Because the user's touch ends, at a start point of the third period TP3', the capacitance Cm may be varied to have the value greater than the reference value BL. In the third period TP3', the capacitance Cm may decrease due to a low temperature. Because the decreasing speed of the capacitance Cm is great, the capacitance Cm may be smaller than the reference value BL before the third period TP3' ends.

That is, an event may occur where the capacitance Cm is smaller than the reference value BL even though the user's touch is not made. In this case, the second sensing control part T-IC2 according to a comparative example may recognize the event as the user's touch. The above event may be defined as a ghost touch. The reference value BL may be maintained uniformly, and the capacitance Cm may be smaller than the reference value BL and may decrease. The ghost touch may cause an abnormal operation of the display device DD. In this case, in embodiments, the tracking operation is not performed in the fourth period TP4.

Figure 15:
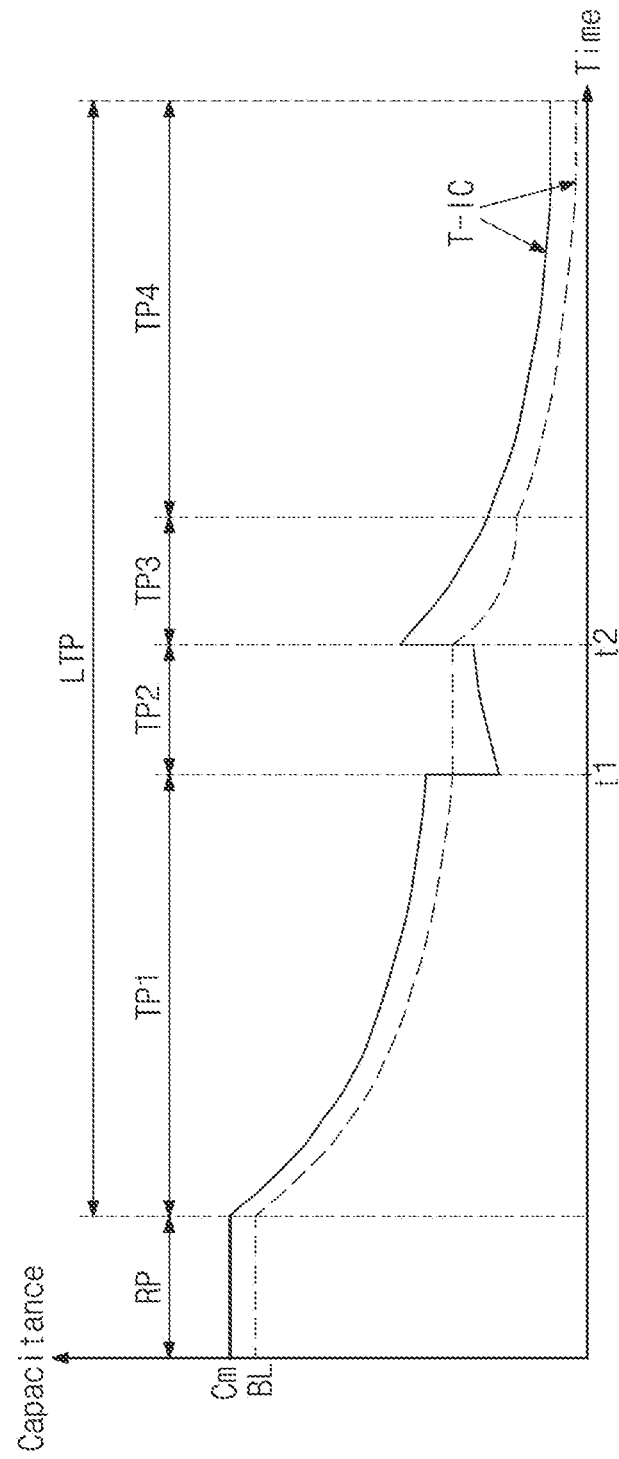
FIG. 15 is a diagram for describing an operation of a sensing control part according to an embodiment of the present disclosure.

FIG. 15 is a diagram for describing an operation of a sensing control part according to an embodiment of the present disclosure.

Like FIG. 13, in FIG. 15, the horizontal axis represents time, and the vertical axis represents a capacitance value.

Referring to FIGS. 12 and 15, as in the first and second sensing control parts T-IC1 and T-IC2 according to comparative examples, a driving period of the sensing control part T-IC according to an embodiment may be divided into the reference mode period RP and the low-temperature mode period LTP.

When the ambient temperature is not lower than the reference temperature, the sensing control part T-IC according to an embodiment may be driven in the reference touch mode during the reference mode period RP. When the ambient temperature sensed by the temperature sensor T-S is lower than the reference temperature, the sensing control part T-IC according to an embodiment may be driven in the low-temperature touch mode during the low-temperature mode period LTP.

The low-temperature mode period LTP may include a first period TP1, a second period TP2 following the first period TP1, a third period TP3 following the second period TP2, and a fourth period TP4 following the third period TP3. The third period TP3 illustrated in FIG. 15 may be different from the third period TP3' illustrated in FIG. 14.

During the first period TP1 and the second period TP2, the operations of the sensing control part T-IC according to an embodiment may be similar to the operations of the first and second sensing control parts T-IC1 and T-IC2 according to comparative examples. When the ambient temperature is lower than the reference temperature, the sensing control part T-IC according to an embodiment may perform the tracking operation during the first period TP1. That is, when the ambient temperature is lower than the reference temperature, the sensing control part T-IC according to an embodiment may vary the reference value BL such that the reference value BL decreases along the decrease in the capacitance Cm.

During the second period TP2 where the user's touch is made, the sensing control part T-IC according to an embodiment may maintain the reference value BL uniformly and may compare the capacitance Cm and the reference value BL to sense the user's touch. Also, as described above, during the second period TP2, the capacitance Cm may be varied, that is, increased by the user's temperature while having a value smaller than the reference value BL.

The third period TP3 may be defined as the standby period. For example, the third period TP3 may be defined as the preparation period for again performing the tracking operation after the sensing control part T-IC according to an embodiment performs the touch sensing operation.

In the third period TP3, the capacitance Cm may be varied, that is, decreased due to a low temperature. During the third period TP3, the sensing control part T-IC according to an embodiment may vary the reference value BL such that the reference value BL decreases. That is, according to an embodiment, during the third period TP3 which is the standby period, the sensing control part T-IC does not maintain the reference value BL, but instead may vary the reference value BL.

During the third period TP3, the sensing control part T-IC according to an embodiment may vary the reference value BL such that the reference value BL has the value smaller than the capacitance Cm. Accordingly, because the capacitance Cm has the value greater than the reference value BL during the third period TP3, the ghost touch phenomenon described with reference to FIG. 14 may be prevented.

During the fourth period TP4, the sensing control part T-IC according to an embodiment may perform the tracking operation. As such, in the case where the capacitance Cm decreases due to a low temperature, the sensing control part T-IC according to an embodiment may decrease the reference value BL. The capacitance Cm and the reference value BL may be maintained uniformly at a specific point in time.

During the third period TP3, the reference value BL may be calculated by the sensing control part T-IC according to an embodiment in the following scheme. A decreasing speed of the capacitance Cm in the first period TP1 may be calculated as a first value. An increasing speed of the capacitance Cm in the second period TP2 may be calculated as a second value. A decreasing speed of the reference value BL in the third period TP3 may be calculated as a third value using the first value and the second value. Each of the decreasing speed and the increasing speed may be a slope of a graph.

The above calculation scheme is expressed by Equation 1 below, and the decreasing speed of the reference value BL in the third period TP3 is determined by Equation 1 below.

$$2(x1 - x2) \geq x3 \geq (x1 - x2) \qquad \text{[Equation 1]}$$

In Equation 1 above, x1 may be defined as the decreasing speed of the capacitance Cm in the first period TP1, x2 may be defined as the increasing speed of the capacitance Cm in the second period TP2, and x3 may be defined as the decreasing speed of the reference value BL in the third period TP3. Accordingly, x1 may be defined as the first value, x2 may be defined as the second value, and x3 may be defined as the third value.

In an embodiment, x1 and x2 may be calculated in units of given time. In an embodiment, x1 and "x2 may be calculated as an average speed of a unit of about 0.1 second. For example, x1 and ×2 may be determined by calculating an average speed of the decreasing speed and the increasing speed of the capacitance Cm during about 0.1 seconds. Subsequently, x1 and x2 may be determined by calculating an average speed of the decreasing speed and the increasing speed of the capacitance Cm during a next unit of about 0.1 seconds. x3 may be determined depending on x1 and x2.

An embodiment in which the decreasing speed of the capacitance Cm is set to x1 is described, but the present disclosure is not limited thereto. For example, because the capacitance Cm and the reference value BL decrease together during the first period TP1, instead of the decreasing speed of the capacitance Cm, the decreasing speed of the reference value BL may be set to x1. That is, in an embodiment of the present disclosure, x1 may be defined as the decreasing speed of the reference value BL.

The second period TP2 may be set to be longer than a reference sensing time and shorter than or equal to about 1.5 times the reference sensing time. For example, the reference sensing time may be defined as a minimum sensing time for sensing the user's touch and may be set to about 0.1 seconds. However, the present disclosure is not limited thereto. For example, the reference sensing time may be set to various values depending on the specification of the sensing control part T-IC and the input sensing part ISP.

In an embodiment, the third period TP3 may be set to be greater than or equal to the second period TP2 and smaller than or equal to twice the second period TP2.

According to an embodiment of the present disclosure, in the low-temperature touch mode, because a reference value decreases during a given period (e.g., the third period TP3) following the touch sensing period (e.g., the second period TP2), the capacitance may have the value greater than the reference value after the touch sensing period. Accordingly, a ghost touch phenomenon that can occur when the capacitance is smaller than the reference value after the touch sensing period may be prevented according to embodiments.

Figure 16:
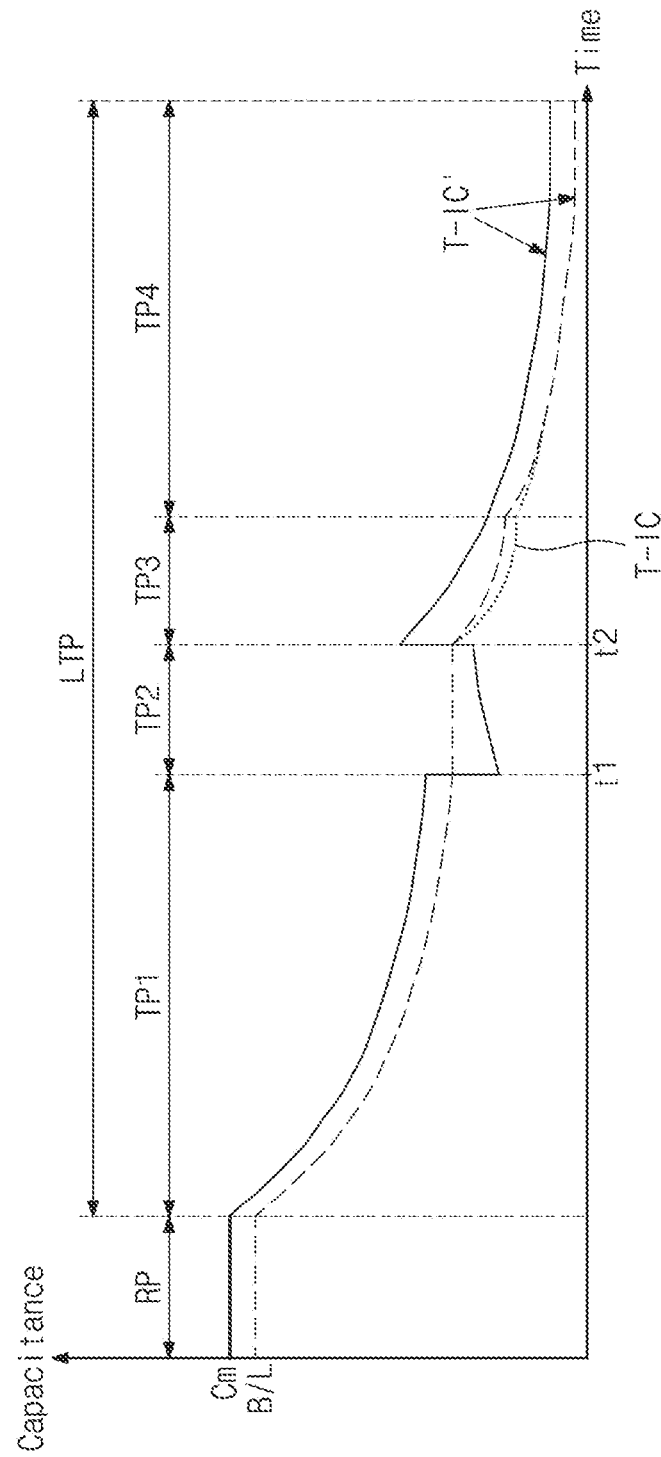
FIG. 16 is a diagram for describing an operation of a sensing control part according to an embodiment of the present disclosure.

FIG. 16 is a diagram for describing an operation of a sensing control part according to an embodiment of the present disclosure.

Below, an operation of a sensing control part T-IC' will be described mainly based on a difference with the graph illustrated in FIG. 15. In an embodiment, in FIG. 16, the graph of the reference value BL associated with the sensing control part T-IC illustrated in FIG. 15 is illustrated together with the graph of the reference value BL associated with the sensing control part T-IC'.

Referring to FIG. 16, operations in the first period TP1 and the second period TP2 are identical to those described with reference to FIG. 15, and thus, additional description will be omitted to avoid redundancy.

During the third period TP3, the sensing control part T-IC' may vary the reference value BL such that the reference value BL decreases. During the third period TP3, the sensing control part T-IC' may vary the reference value BL such that the reference value BL has the value smaller than the capacitance Cm.

The decreasing speed of the reference value BL may be variously set under the condition that the reference value BL has the value smaller than the capacitance Cm. For example, the decreasing speed of the capacitance Cm in the first period TP1 may be calculated as a first value, and the decreasing speed of the reference value BL in the third period TP3 may be calculated as a third value using the first value.

The above calculation scheme is expressed by Equation 2 below, and the decreasing speed of the reference value BL in the third period TP3 is determined by Equation 2 below.

$$2(x1) \geq x3 \geq (x1) \quad \text{[Equation 2]}$$

In Equation 2 above, x1 (the first value) may be defined as the decreasing speed of the capacitance Cm in the first period TP1, and x3 (the third value) may be defined as the decreasing speed of the reference value BL in the third period TP3. Because only a value of x1 is used, the decreasing speed of the reference value BL illustrated in FIG. 16 may be smaller than the decreasing speed of the reference value BL illustrated in FIG. 15, but the reference value BL may have the value smaller than the capacitance Cm.

Figure 17:
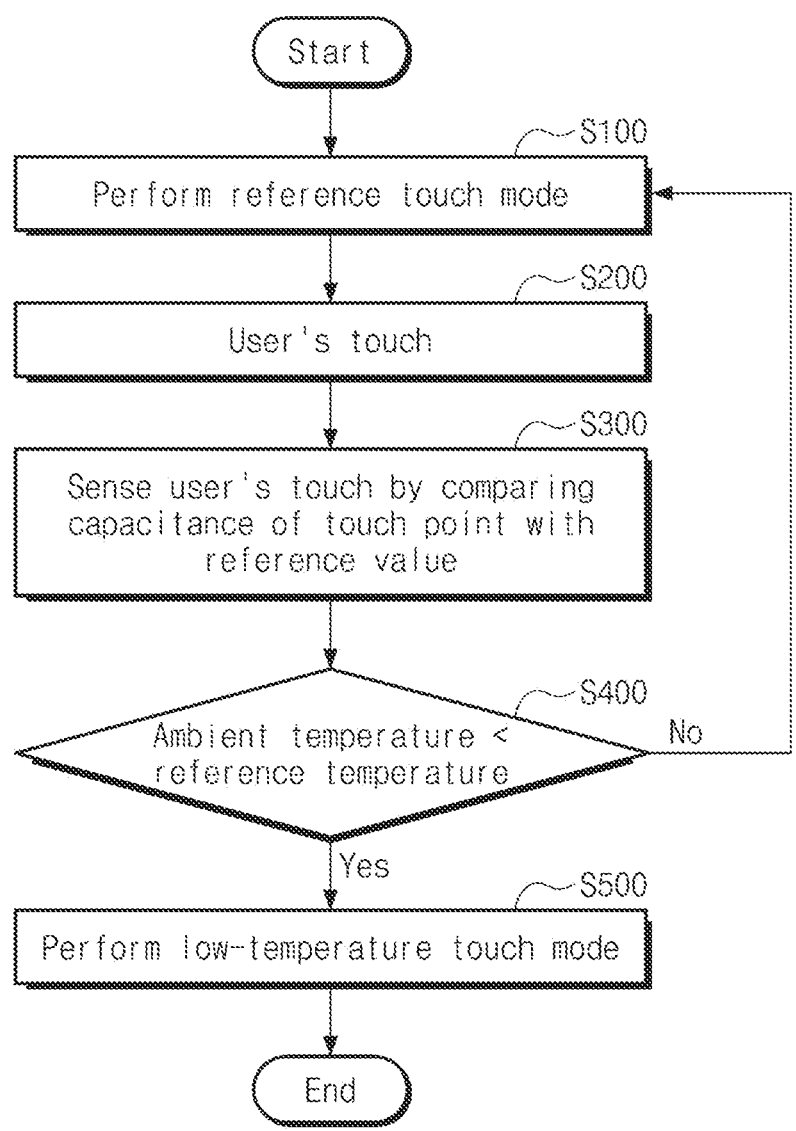
FIG. 17 is a flowchart for describing a driving method of a touch sensing part according to an embodiment of the present disclosure.

FIG. 17 is a flowchart for describing a driving method of a touch sensing part according to an embodiment of the present disclosure.

Referring to FIG. 17, in operation S100, the touch sensing part TSP may be driven in the reference touch mode described with reference to FIGS. 12 and 13. As described with reference to FIGS. 12 and 13, in operation S200, the user's touch may be made. In operation S300, the user's touch may be sensed by comparing the capacitance Cm of a touch point and the reference value BL.

When it is determined in operation S400 that the ambient temperature measured by the temperature sensor T-S is lower than the reference temperature, operation S500 may be performed. When it is determined in operation S400 that the ambient temperature is not lower than the reference temperature, the procedure proceeds to operation S100 to perform the reference touch mode.

In operation S500, the touch sensing part TSP may be driven in the low-temperature touch mode described with reference to FIG. 15.

Figure 18:
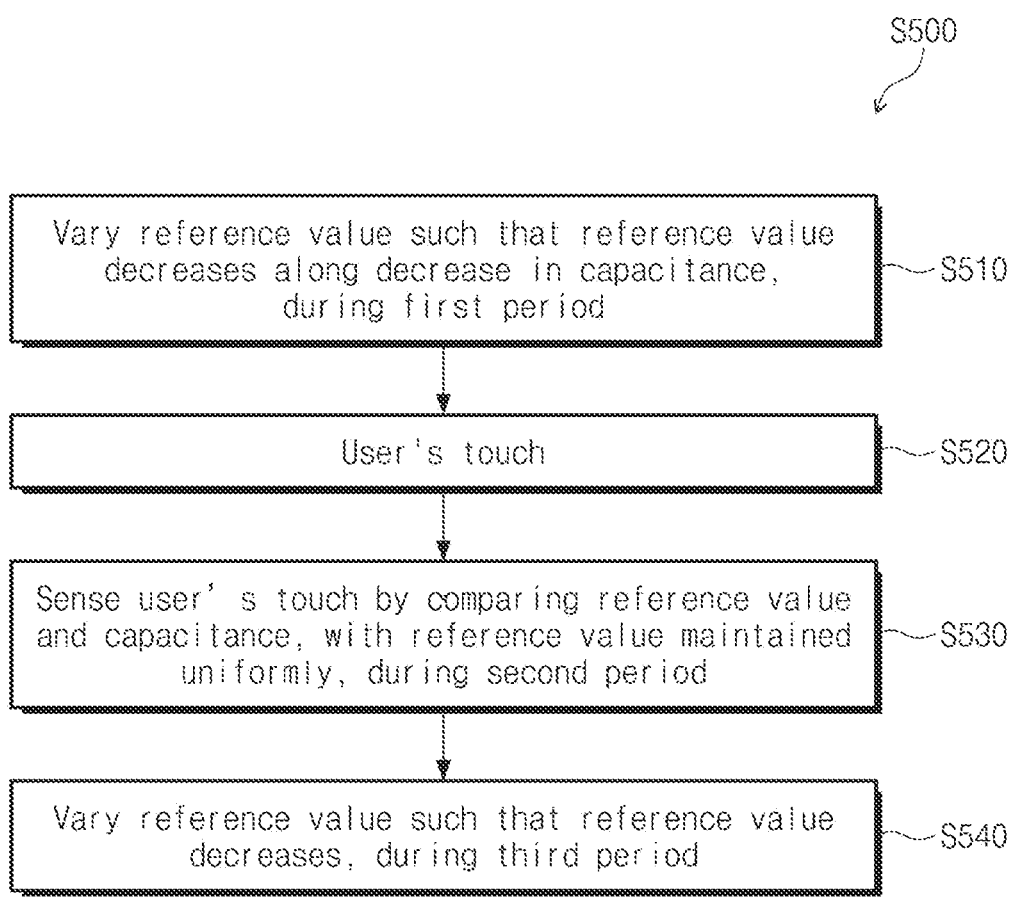
FIG. 18 is a flowchart for describing an operation in a low-temperature touch mode illustrated in FIG. 17.

FIG. 18 is a flowchart for describing an operation in a low-temperature touch mode illustrated in FIG. 17.

Referring to FIGS. 15 and 18, operation S500 in which the low-temperature touch mode is performed may include operations S510 to S540 illustrated in FIG. 18. In operation S510, the reference value BL may be varied such that the reference value BL decreases along the decrease in the capacitance Cm during the first period TP1.

In operation S520, the user's touch may be made. In operation S530, the user's touch may be sensed by comparing the reference value BL and the capacitance Cm during the second period TP2 where the reference value BL is maintained uniformly. In operation S540, the reference value BL may be varied such that the reference value BL decreases during the third period TP3.

Figure 19:
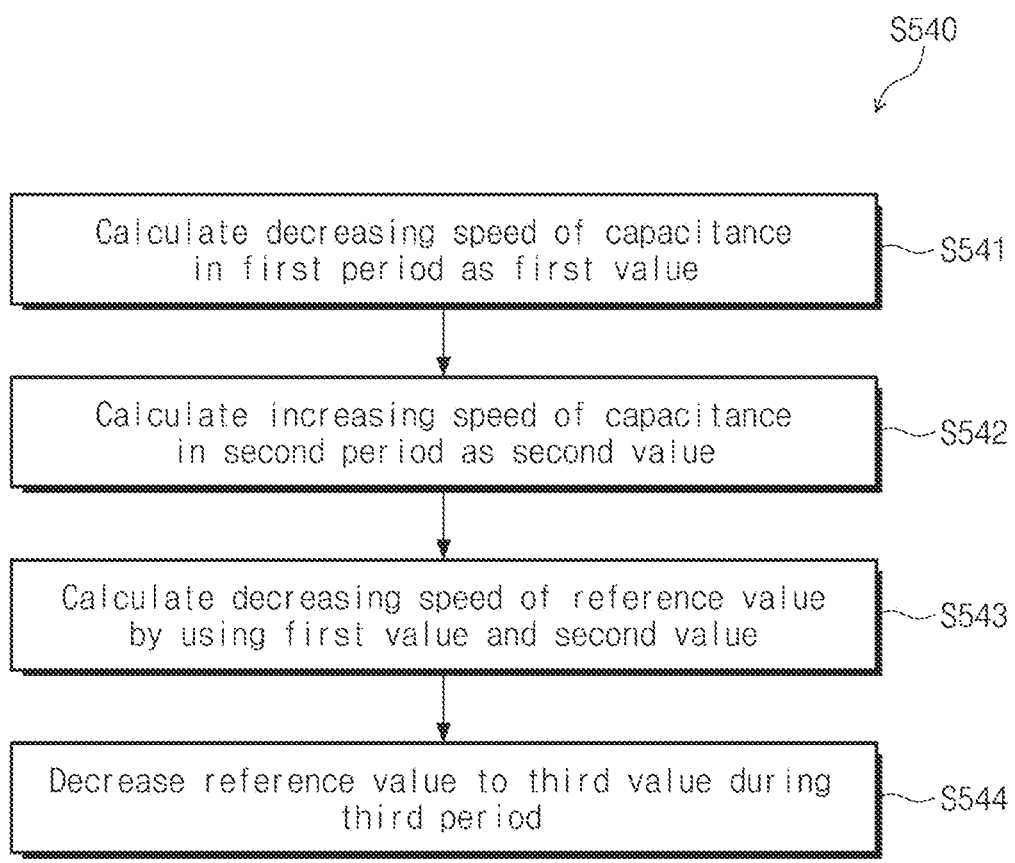
FIG. 19 is a flowchart for describing an operation of varying a reference value, which is illustrated in FIG. 18.

FIG. 19 is a flowchart for describing an operation of varying a reference value, which is illustrated in FIG. 18.

Referring to FIGS. 15 and 19, operation S540 in which a reference value is varied may include operations S541 to S544 illustrated in FIG. 19. In operation S541, the decreasing speed of the capacitance Cm in the first period TP1 may be calculated as a first value. In operation S542, the increasing speed of the capacitance Cm in the second period TP2 may be calculated as a second value.

In operation S543, the decreasing speed of the reference value BL may be calculated as a third value using the first value and the second value. In operation S544, the reference value BL may decrease to the third value during the third period TP3. As described above, the third value may be set based on Equation 1 above.

Figure 20:
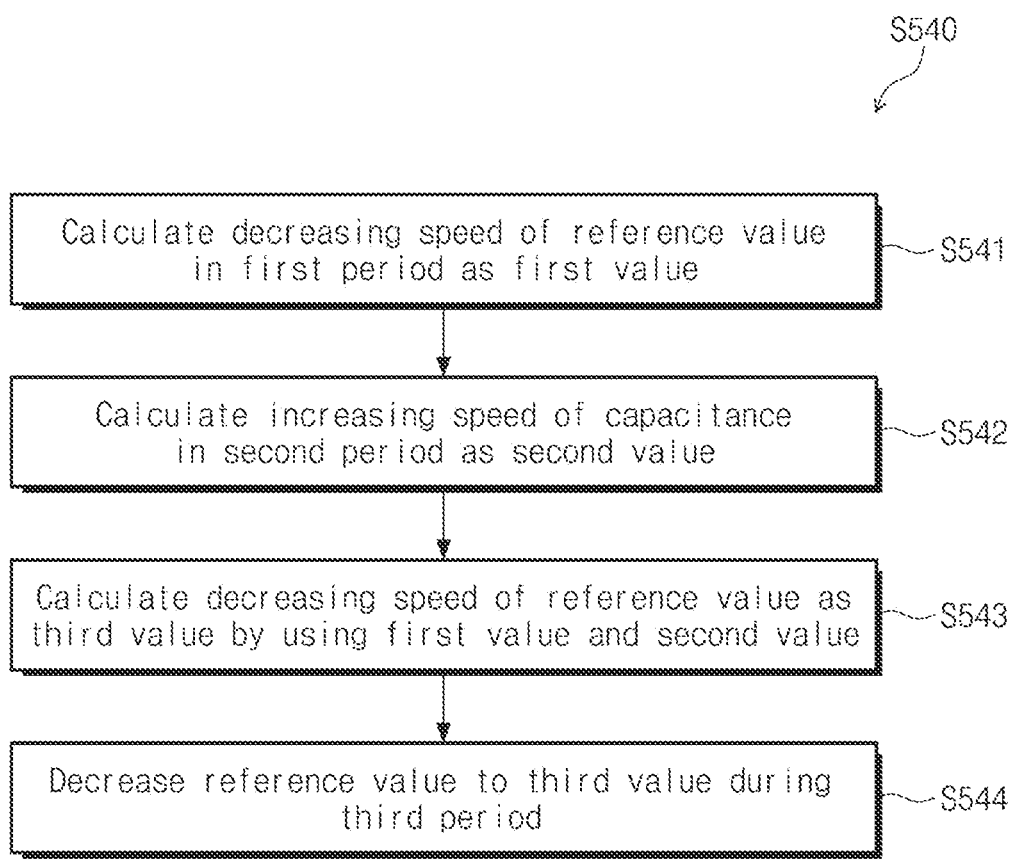
FIG. 20 is a flowchart for describing an operation of varying a reference value, according to an embodiment of the present disclosure.

FIG. 20 is a flowchart for describing an operation of varying a reference value, according to an embodiment of the present disclosure.

Below, an operation illustrated in FIG. 20 will be described mainly based on a difference with the operation illustrated in FIG. 19.

In FIG. 19, the decreasing speed of the capacitance Cm may be calculated as the first value, but the present disclosure is not limited thereto. In FIG. 20, the decreasing speed of the reference value BL may be calculated as the first value. In this case, in operation S541, the decreasing speed of the reference value BL in the first period TP1 may be calculated as the first value. Operations S542 to S544 are identical to those described with reference to FIG. 19, and thus, additional description will be omitted to avoid redundancy.

Figure 21:
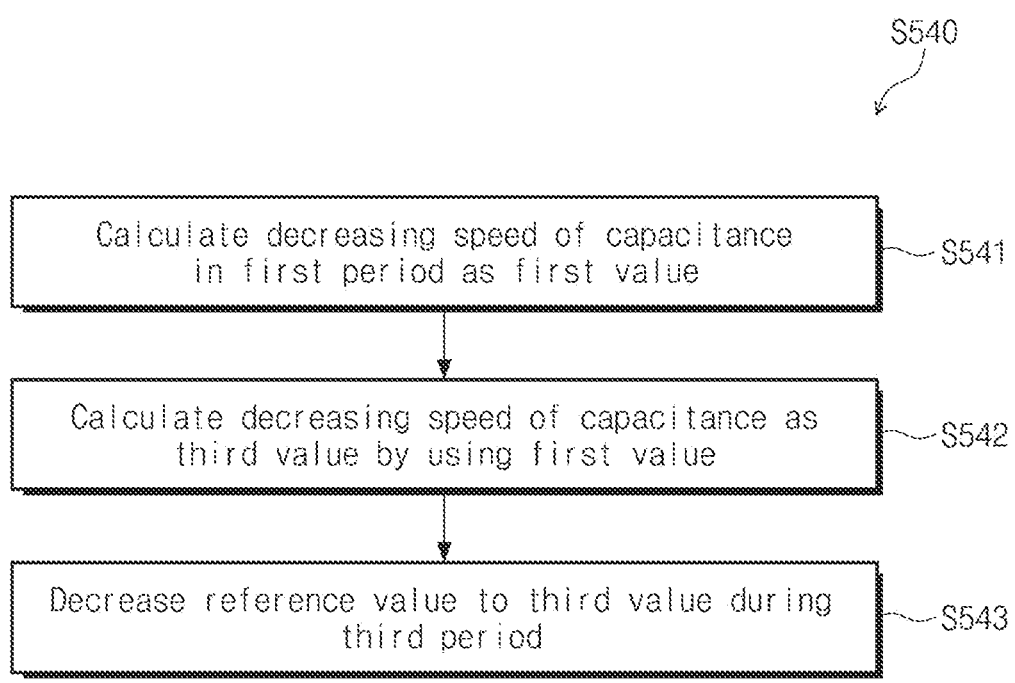
FIG. 21 is a flowchart for describing an operation of varying a reference value, according to an embodiment of the present disclosure.

FIG. 21 is a flowchart for describing an operation of varying a reference value, according to an embodiment of the present disclosure.

FIG. 21 is a diagram for describing an operating method according to Equation 2 above.

Below, an operation described with reference to FIG. 21 will be described mainly based on a difference with the operation illustrated in FIG. 19.

Referring to FIG. 21, in operation S541, the decreasing speed of the capacitance Cm in the first period TP1 may be calculated as the first value. In operation S542, the decreasing speed of the reference value BL may be calculated as the third value using the first value. In operation S543, the reference value BL may decrease to the third value during the third period TP3. The third value described with reference to FIG. 21 may be set based on Equation 2 above.

In an embodiment of the present disclosure, the reference value BL may decrease in the third period TP3, which may prevent or reduce a ghost touch phenomenon. However, the present disclosure is not limited thereto. For example, in an embodiment of the present disclosure, the sensing control part T-IC does not perform the touch sensing operation during the third period TP3. For example, in an embodiment, the sensing control part T-IC does not provide the driving signal to the input sensing part ISP and does not receive the sensing signal.

According to an embodiment of the present disclosure, in a low-temperature touch mode, because the reference value decreases during a given period, the capacitance may have the value greater than the reference value after the touch sensing period. Accordingly, the ghost touch phenomenon that can occur when the capacitance is smaller than the reference value after the touch sensing period may be prevented or reduced.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A driving method of a touch sensing part, the method comprising:
    sensing a touch of a user by comparing a capacitance formed by a first sensing electrode and a second sensing electrode crossing the first sensing electrode with a reference value in a reference touch mode;
    when an ambient temperature is lower than a reference temperature, varying the reference value such that the reference value decreases along a decrease in the capacitance, during a first period;
    when touch of the user is made, sensing the touch of the user by comparing the reference value and the capacitance, with the reference value maintained uniformly, during a second period following the first period; and
    varying the reference value such that the reference value decreases, and remains below the capacitance, during a third period following the second period.

2. The method of claim 1, wherein, during the third period, the capacitance is varied to decrease.

3. The method of claim 2, wherein, during the third period, the reference value is varied to have a value smaller than the capacitance.

4. The method of claim 1, wherein, during the first period, the reference value is varied to have a value smaller than the capacitance.

5. The method of claim 1, wherein, when the touch of the user is made, during the second period, the capacitance is varied to have a value smaller than the reference value.

6. The method of claim 1, wherein, during the second period, the capacitance is varied to increase along a temperature of the user while having a value smaller than the reference value.

7. The method of claim 6, wherein varying the reference value during the third period comprises:
    calculating a decreasing speed of the capacitance in the first period as a first value;
    calculating an increasing speed of the capacitance in the second period as a second value;
    calculating a decreasing speed of the reference value as a third value using the first value and the second value; and
    decreasing the reference value to the third value during third period.

8. The method of claim 6, wherein, during the third period, a decreasing speed of the reference value is determined by a following equation:

$$2(x1 - x2) \geq x3 \geq (x1 - x2),$$

wherein x1 is defined as a decreasing speed of the capacitance during the first period, x2 is defined as an increasing speed of the capacitance during the second period, and x3 is defined as the decreasing speed of the reference value during the third period.

9. The method of claim 8, wherein x1 and x2 are calculated as an average speed of a unit of about 0.1 seconds.

10. The method of claim 6, wherein, during the third period, a decreasing speed of the reference value is determined by a following equation:

$$2(x1 - x2) \geq x3 \geq (x1 - x2),$$

wherein x1 is defined as a decreasing speed of the reference value during the first period, x2 is defined as an increasing speed of the capacitance during the second period, and x3 is defined as the decreasing speed of the reference value during the third period.

11. The method of claim 1, wherein, during the reference touch mode, when the touch of the user is not made, the capacitance and the reference value are maintained uniformly, and the capacitance has a value greater than the reference value, and
    wherein, during the reference touch mode, when the touch of the user is made, the capacitance is varied to have a value smaller than the reference value.

12. The method of claim 1, wherein the second period is set to be longer than a reference sensing time and shorter than or equal to about 1.5 times the reference sensing time.

13. The method of claim 12, wherein the reference sensing time is defined as a minimum sensing time for sensing the touch of the user and is set to about 0.1 seconds.

14. The method of claim 12, wherein the third period is set to be longer than or about equal to the second period and shorter than or about equal to twice the second period.

15. The method of claim 1, wherein, during the third period, a decreasing speed of the reference value is determined by a following equation:

$$2(x1) \geq x3 \geq (x1),$$

wherein x1 is defined as a decreasing speed of the capacitance during the first period, and x3 is defined as the decreasing speed of the reference value during the third period.

16. A driving method of a touch sensing part, the method comprising:
    sensing a touch of a user by comparing a capacitance formed by a first sensing electrode and a second sensing electrode crossing the first sensing electrode with a reference value in a reference touch mode;
    when an ambient temperature is lower than a reference temperature, varying the reference value depending on a change in the capacitance, during a first period;

when the touch of the user is made, sensing the touch of the user by comparing the reference value and the capacitance, with the reference value maintained uniformly, during a second period following the first period; and varying the reference value during a third period following the second period such that the reference value remains below the capacitance during the third period.

17. The method of claim 16, wherein, during the third period, the capacitance and the reference value are varied to decrease, and the reference value has a value smaller than the capacitance.

18. The method of claim 16, wherein, during the first period, the reference value is varied to decrease while having a value smaller than the capacitance, and wherein, when the touch of the user is made, during the second period, the capacitance is varied to increase along a temperature of the user while having a value smaller than the reference value.

19. The method of claim 18, wherein, during the third period, a decreasing speed of the reference value is determined by a following equation:

$$2(x1 - x2) \geq x3 \geq (x1 - x2),$$

wherein x1 is defined as a decreasing speed of the capacitance during the first period, x2 is defined as an increasing speed of the capacitance during the second period, and x3 is defined as the decreasing speed of the reference value during the third period.

20. A touch sensing part, comprising:
a first sensing electrode;
a second sensing electrode insulated from and intersecting with the first sensing electrode;
a sensing control part configured to apply a driving signal to the first sensing electrode, to receive a sensing signal through the second sensing electrode, and to compare the sensing signal and a reference value; and
a temperature sensor configured to sense an ambient temperature,
wherein the sensing signal is defined as a change in a capacitance formed by the first and second sensing electrodes, and
wherein the sensing control part is configured to:
when the ambient temperature is lower than a reference temperature, decrease the reference value along a decrease in the capacitance;
when a touch of a user is made, sense the touch of the user by comparing the reference value and the capacitance, with the reference value maintained uniformly; and
vary the reference value such that the reference value decreases, and remains below the capacitance, during a given period following the touch sensing.

21. An electronic device for provide an image, comprising:
a display device comprising:
a display panel displaying an image; and
a touch sensing part disposed on the display panel and sensing a touch input,
wherein the touch sensing part comprises:
a first sensing electrode;
a second sensing electrode insulated from and intersecting with the first sensing electrode;
a sensing control part configured to apply a driving signal to the first sensing electrode, to receive a sensing signal through the second sensing electrode, and to compare the sensing signal and a reference value; and
a temperature sensor configured to sense an ambient temperature,
wherein the sensing signal is defined as a change in a capacitance formed by the first and second sensing electrodes, and
wherein the sensing control part is configured to:
when the ambient temperature is lower than a reference temperature, decrease the reference value along a decrease in the capacitance;
when a touch of a user is made, sense the touch of the user by comparing the reference value and the capacitance, with the reference value maintained uniformly; and
vary the reference value such that the reference value decreases, and remains below the capacitance, during a given period following the touch sensing.

* * * * *